United States Patent [19]

Lee et al.

[11] Patent Number: 5,758,116
[45] Date of Patent: May 26, 1998

[54] INSTRUCTION LENGTH DECODER FOR GENERATING OUTPUT LENGTH INDICIA TO IDENTITY BOUNDARIES BETWEEN VARIABLE LENGTH INSTRUCTIONS

[75] Inventors: Chan W. Lee, Portland; Gary L. Brown, Aloha; Adrian L. Carbine, Hillsboro; Ashwani Kumar Gupta, Beaverton, all of Oreg.

[73] Assignee: Intel Corporation, Santa Clara, Calif.

[21] Appl. No.: 316,208

[22] Filed: Sep. 30, 1994

[51] Int. Cl.⁶ .................................................. G06F 12/04
[52] U.S. Cl. ............................................. 395/386; 395/389
[58] Field of Search ....................................... 395/375, 386

[56] References Cited

U.S. PATENT DOCUMENTS

| | | | |
|---|---|---|---|
| 4,050,058 | 9/1977 | Garlic | 364/200 |
| 4,199,811 | 4/1980 | Borgerson et al. | 364/200 |
| 4,236,206 | 11/1980 | Strecker et al. | |
| 4,342,078 | 7/1982 | Tredennick et al. | 364/200 |
| 4,376,976 | 3/1983 | Lahti et al. | 364/200 |
| 4,394,736 | 7/1983 | Bernstein et al. | 364/200 |
| 4,399,505 | 8/1983 | Druke et al. | 364/200 |
| 4,502,111 | 2/1985 | Riffe et al. | |
| 4,530,050 | 7/1985 | Fukunaga et al. | 364/200 |
| 4,591,972 | 5/1986 | Guyer et al. | 364/200 |
| 4,654,781 | 3/1987 | Schwartz et al. | 364/200 |
| 4,714,994 | 12/1987 | Oklobdzija et al. | |
| 4,745,544 | 5/1988 | Renner et al. | 364/200 |
| 4,766,566 | 8/1988 | Chuang | 364/900 |
| 4,875,160 | 10/1989 | Brown, III | 364/200 |
| 4,928,223 | 5/1990 | Dao et al. | 364/200 |
| 5,005,118 | 4/1991 | Lenoski | 364/200 |
| 5,101,344 | 3/1992 | Bonet et al. | 395/375 |
| 5,113,515 | 5/1992 | Fite et al. | 395/425 |
| 5,129,067 | 7/1992 | Johnson | 395/375 |
| 5,167,026 | 11/1992 | Murray et al. | |
| 5,168,571 | 12/1992 | Hoover et al. | 395/800 |
| 5,202,967 | 4/1993 | Matsuzaki et al. | 395/375 |
| 5,202,972 | 4/1993 | Gusefski et al. | 395/425 |
| 5,222,244 | 6/1993 | Carbine et al. | 395/800 |
| 5,233,694 | 8/1993 | Hotta et al. | 395/375 |
| 5,235,686 | 8/1993 | Bosshart | 395/375 |

(List continued on next page.)

OTHER PUBLICATIONS

Johnson, Mike, "Superscalar Microprocessor Design", *Prentice Hall, Inc.*, 1991, pp. 1–288.

Popescu, et al., "The Metaflow Architecture", *IEEE*, 1991, pp. 10–13 and pp. 63–73.

*Primary Examiner*—Ayaz R. Sheikh
*Assistant Examiner*—Jigar Pancholi
*Attorney, Agent, or Firm*—Blakely, Sokoloff, Taylor & Zafman

[57] ABSTRACT

A circuit and method for supplying output length marks indicative of the first bytes and last bytes of instructions in a block of instruction code to an instruction decoder. A block of instruction code is input to an input buffer. A plurality of programmable logic arrays (PLAs) is coupled to receive predetermined sets of bytes from the input buffer and to provide instruction information at an output. The output of the PLAs is coupled to fast carry chain circuitry, which serially processes the information from the PLAs and provides a START mark upon each finding of a first byte of an instruction and an END mark upon each finding of a last byte of an instruction. Length information is provided to wraparound logic for length calculations spanning into the next input buffer of instruction code. A FCC latch latches the output length marks from the fast carry chain circuitry and provides an output to the instruction decoder. If a length-varying prefix and a matching length-varying opcode are both present in an instruction, processing in the fast carry chain circuitry is aborted, and processing in slow carry chain circuitry is started. The slow carry chain circuitry processes information from a subset of the input buffer at a time, and thus requires more than one iteration, with a different set of PLA inputs provided by a multiplexer upon each iteration. A SCC latch latches the output length marks from the slow carry chain circuitry and provides an output to the instruction decoder.

21 Claims, 13 Drawing Sheets

U.S. PATENT DOCUMENTS

| | | |
|---|---|---|
| 5,249,273 | 9/1993 | Yoshitake et al. . |
| 5,293,592 | 3/1994 | Fu et al. .................................. 395/375 |
| 5,317,701 | 5/1994 | Reininger et al. . |
| 5,353,420 | 10/1994 | Zaidi . |
| 5,371,864 | 12/1994 | Chuang ................................... 395/375 |
| 5,450,605 | 9/1995 | Grochowski et al. . |
| 5,452,427 | 9/1995 | Tobita et al. . |
| 5,488,710 | 1/1996 | Sato et al. ................................ 395/452 |

INSTRUCTION LENGTH DECODER FOR GENERATING OUTPUT LENGTH INDICIA TO IDENTITY BOUNDARIES BETWEEN VARIABLE LENGTH INSTRUCTIONS

CROSS-REFERENCE TO RELATED APPLICATIONS

Cross-reference is made to the following commonly assigned co-pending patent applications, which are incorporated by reference herein:

Ser. No. 08/204,862, entitled "A Method and Apparatus for Aligning an Instruction Boundary in Variable Length Macroinstructions with an Instruction Buffer", filed Mar. 1, 1994, by Brown et al.;

Ser. No. 08/204,593, entitled "A Decoder for Single Cycle Decoding of Single Prefixes in Variable Length Instructions", filed Mar. 1, 1994, by Brown et al.;

Ser. No. 08/204,601, entitled "A Method for Steering Multiple Variable Length Instructions from an Instruction Buffer to Multiple Decoders", filed Mar. 1, 1994, by Brown et al.; and Ser. No. 08/205,022, entitled "Dual Instruction Buffers with a Bypass Bus and Rotator for a Decoder of Multiple Instructions of Variable Length", filed Mar. 1, 1994, by Gupta et al.

BACKGROUND OF THE INVENTION

1. Field of the Invention

The present invention relates to an instruction length decoding mechanism in a microprocessor that executes variable-length instructions.

2. Description of Related Art

Computers process information by executing a sequence of instructions, which may be supplied from a computer program written in a particular format and sequence designed to direct the computer to operate a particular sequence of operations. Most computer programs are written in high level languages such as FORTRAN or C which are not directly executable by the computer processor. These high level instructions are translated into instructions, termed "macroinstructions" herein, having a format that can be decoded and executed within the processor.

Macroinstructions are conventionally stored in data blocks having a predefined length in a computer memory element, such as main memory or an instruction cache. Macroinstructions are fetched from the memory elements and then supplied to a decoder, in which each macroinstruction is decoded into one or more microinstructions having a form that is executable by an execution unit in the processor.

Pipelined processors define multiple stages for processing a macroinstruction. These stages are defined so that a typical instruction can complete processing in one cycle and then move on to the next stage in the next cycle. In order to obtain maximum efficiency from a pipelined processing path, the decoder and subsequent execution units must process multiple instructions every cycle.

Operations to process multiple macroinstructions every cycle can be complicated by the format of the macroinstructions, particularly if those macroinstructions have a variable length. One example of a popular instruction set that allows variable length instructions is the INTEL Architecture processor instruction set. Please refer to the INTEL486™ Microprocessor Family Programmer's Reference Manual or the INTEL Pentium™ Processor User's Manual (Vol. 3: Architecture and Programming Manual) for further information about the INTEL Architecture processor instruction set.

In the INTEL Architecture processor instruction set, instruction lengths can vary from one to fifteen bytes. With variable length instructions, the location of instruction boundaries (i.e., the location between adjoining macroinstructions in the instruction code) in a block of instruction code is difficult to determine.

Accordingly, it would be advantageous to provide an instruction length decoding mechanism which can quickly determine the length of a variable length instruction, so an instruction decoder can quickly begin decoding a next instruction. Such a mechanism would be useful in parsing the instructions so that multiple instruction decoders can process several instructions in parallel.

Another important consideration in length determination for superscalar computer systems is the placement of the instruction length decoding mechanism in the computer system's pipeline. If the placement of the hardware is such that the length determined by it can sometimes be incorrect, the computer system requires correction hardware to recover from such length errors and will have additional complexity.

Thus, it would be advantageous to place the instruction length decoding mechanism in the computer system's pipeline in such a way as to reduce (or eliminate) the possibility of incorrect instruction length marking.

SUMMARY OF THE INVENTION

A circuit and method is described herein for determining the length of variable length instructions and providing an output vector with output length marks including START marks and END marks to indicate the first bytes and the last bytes of raw instructions, i.e., instructions which have been stripped of their prefixes. The circuit and method is particularly useful for variable length instructions such as the instructions in the INTEL Architecture processor instruction set. The circuit and method is also useful for superscalar microprocessors which execute multiple instructions per clock cycle.

A block of instruction code is input to an input buffer. A plurality of programmable logic arrays (PLAs) is coupled to the input buffer to provide instruction length information at an output. The output of the PLAs is coupled to fast carry chain circuitry, which serially processes the information from the PLAs and provides a START mark upon each finding of a first byte of an instruction and an END mark upon each finding of a last byte of an instruction. Length information is provided to a wraparound logic for length calculations spanning into the next input buffer of instruction code. A FCC latch latches the START marks and END marks and provides a length mark vector output to the instruction decoder after passing through a rotator.

If a length-varying prefix and a matching length-varying opcode are both present in an instruction, processing in the fast carry chain circuitry is aborted, and processing in slow carry chain circuitry is started. The slow carry chain circuitry processes the input buffer at a slower rate than the fast carry chain circuitry. A SCC latch latches the START marks and END marks from the slow carry chain circuitry and provides a length mark vector output to the instruction decoder after passing through the rotator.

BRIEF DESCRIPTION OF THE DRAWINGS

FIG. 10 is a subroutine of FIG. 8.

FIG. 12 is a subroutine of FIG. 8.

DETAILED DESCRIPTION OF THE PREFERRED EMBODIMENT

FIGS. 1 through 13 of the drawings disclose various embodiments of the present invention for purposes of illustration only. One skilled in the art will readily recognize from the following discussion that alternative embodiments of the structures and methods illustrated herein may be employed without departing from the principles of the invention. The following description may include specific numbers and quantities associated with the circuit and methods described herein. It should be apparent to one skilled in the art that these numbers and quantities are utilized herein for illustrative purposes. For example, the number of bits in a particular field can vary between embodiments.

Figure 1:
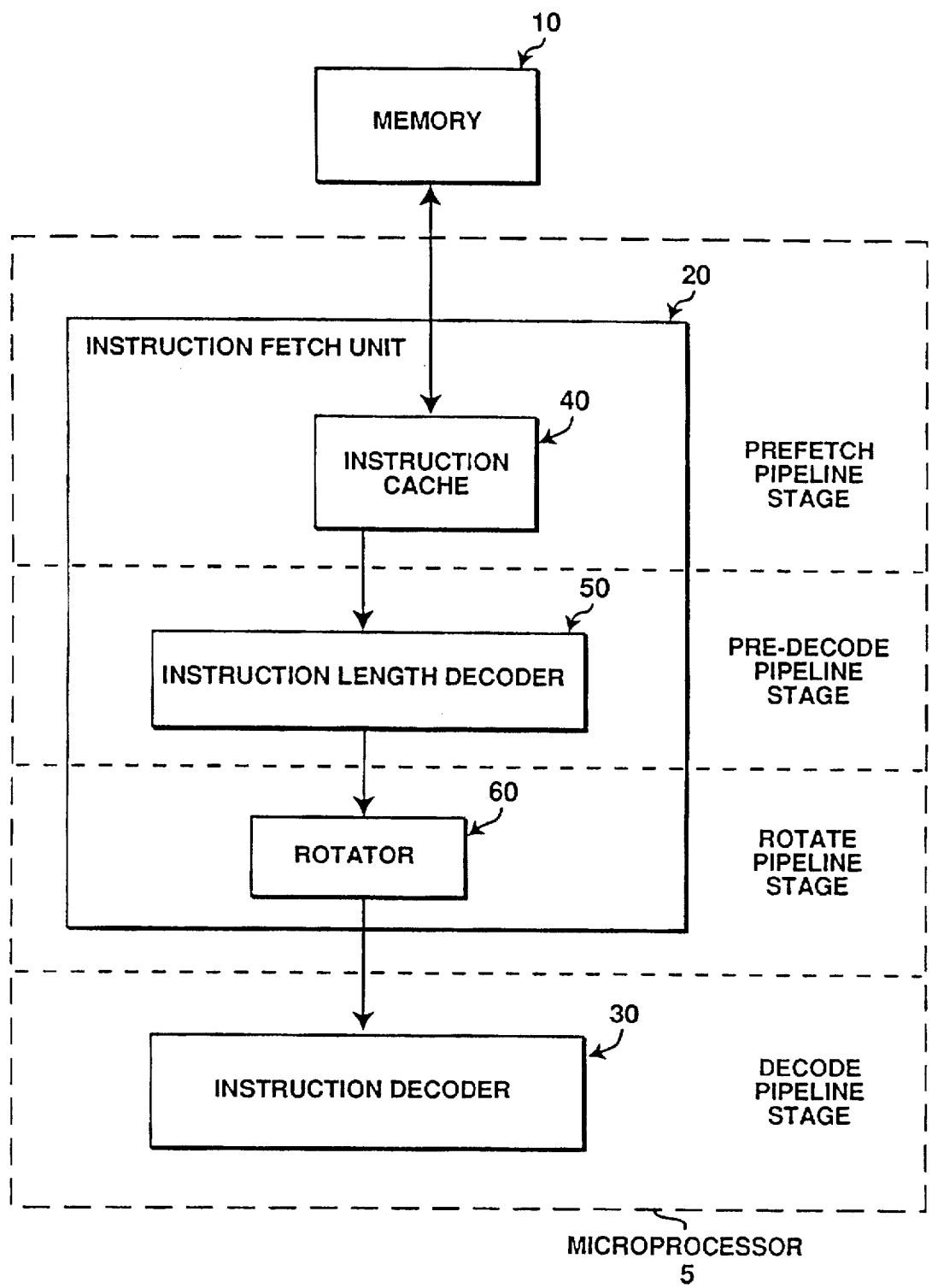
FIG. 1 is a block diagram of the system layout of a microprocessor including an instruction fetch unit and an instruction decoder.

FIG. 1 is a block diagram of the system layout of a microprocessor 5 including an instruction fetch unit 20 and an instruction decoder 30. One skilled in the art will recognize that other parts of the microprocessor, such as the execution unit, are not shown so as not to obscure the claimed invention.

A memory system 10 is coupled to the instruction fetch unit 20. The instruction fetch unit 20 fetches instructions originating from the memory 10. The instruction fetch unit 20 includes an instruction cache 40, which stores instructions fetched from the memory system 10. Access to the instruction cache 40 is faster than access to the memory system 10. The instruction cache 40 is coupled to provide input to an instruction length decoder (ILD) 50. The ILD 50 generates output length marks which indicate the first bytes and last bytes of instructions provided to the ILD. The ILD 50 provides its output length marks at a length mark vector output to a rotator 60.

The rotator 60 uses the output length marks to align its output on an instruction boundary, i.e., starting at the beginning of an instruction. The rotator 60 is coupled to provide an output to an instruction decoder 30, which decodes the instruction for further execution by the microprocessor 5. Further information about the rotator 60 can be found in the co-pending patent application "Dual Instruction Buffers with a Bypass Bus and Rotator for a Decoder of Multiple Instructions of Variable Length" by Gupta et al., Ser. No. 08/205,022, filed Mar. 1, 1994.

In a pipelined microprocessor, the partial processing of one set of data, or data block, occurs in one pipeline stage, while the partial processing of another data block occurs concurrently in another pipeline stage. In the described embodiment, the microprocessor is pipelined, and the instruction cache 40, the ILD 50, the rotator 60, and the instruction decoder 30 each make up a pipeline stage. Thus, in one clock cycle, the following pipelined processes may occur concurrently: a first data block can be stored into the instruction cache 40 in a prefetch pipeline stage; a second data block can be processed in the ILD 50 in a pre-decode pipeline stage; a third data block can be processed in the rotator 60 in a rotate pipeline stage; and a fourth data block can be decoded in the instruction decoder 30 in a decode pipeline stage. In the next clock cycle, each data block will be shifted to be processed by the subsequent pipeline stage. A new data block will enter the first pipeline stage, if available, and a data block in the last pipeline stage will exit the pipeline.

The placement of the ILD 50 in a pipeline stage between the instruction cache 40 pipeline stage and the instruction decoder 30 pipeline stage avoids the potential need to recalculate output length marks for a given instruction cache line. For example, if the ILD 50 pipeline stage came before the instruction prefetch pipeline stage in which the instruction cache 40 gets its data from memory, then the ILD 50 in some cases would mark only part of a cache line with output length marks. However, at the same time, the entire cache line would be written into the cache. If subsequently, execution were to jump backwards within that same cache line, then problems might occur since this instruction code would already be in the cache, but without the corresponding output length marks. Thus, the placement of the ILD 50 after the instruction cache 40 allows for a simpler design which does not need an output length mark correction mechanism.

Furthermore, the placement of the ILD 50 in a pipeline stage before the instruction decoder 30 pipeline stage allows the instruction decoder 30 to take advantage of the output length marks in order to quickly begin decoding a next instruction. Such a mechanism would also be useful in parsing the instructions so that multiple instruction decoders can process several instructions in parallel.

Figure 2:
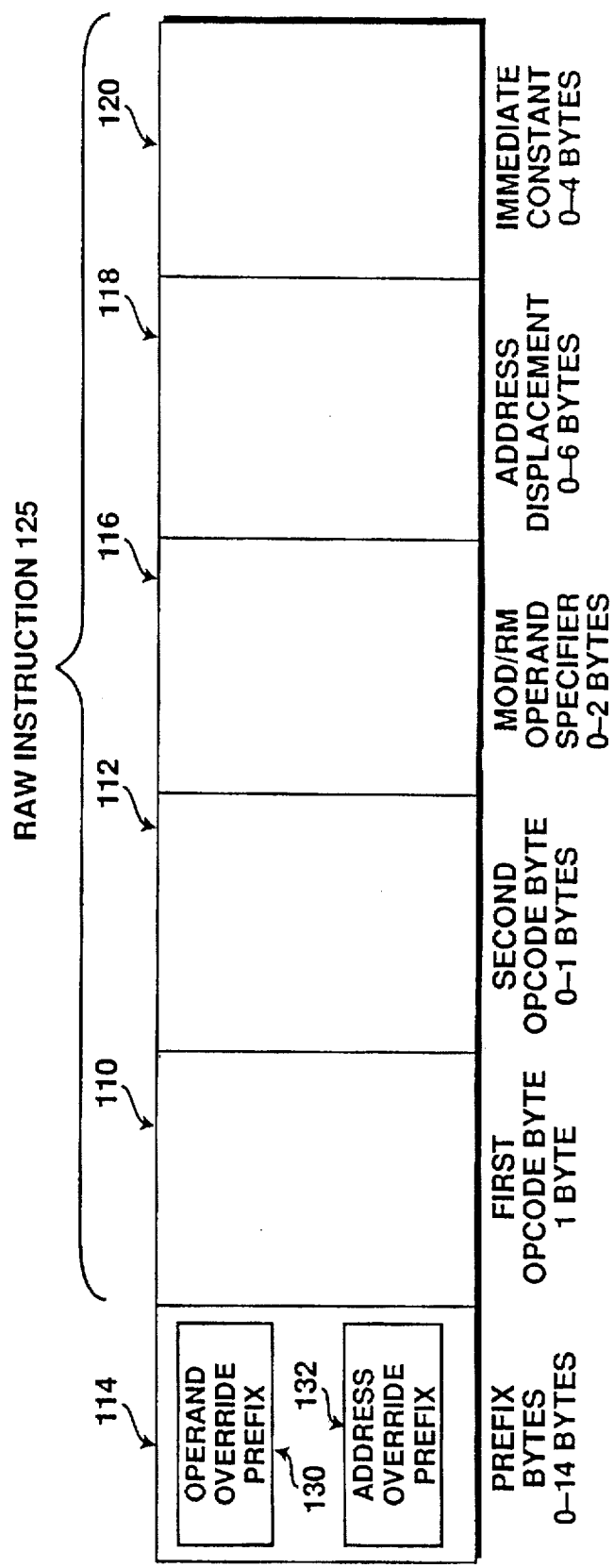
FIG. 2 is a block representation of the instruction format used by an INTEL Architecture microprocessor.

FIG. 2 is a block representation of the instruction format used by an INTEL Architecture microprocessor. In this format, the length of an instruction may range from one byte to fifteen bytes. The only required byte is a first opcode byte 110. A second opcode byte 112 is optional. Additionally, instructions may include one or more of the following bytes: prefix bytes 114, Mod/RM Operand Specifier bytes 116, Address displacement bytes 118, and Immediate Constant bytes 120.

Zero to fourteen of the prefix bytes 114 may precede the first opcode byte 110. The prefix bytes 114 have several effects; for example, they may override a default segment, indicate a string instruction loop, or indicate a bus LOCK cycle while executing the instruction.

Additionally, the prefix bytes 114 may include an operand override prefix 130 which, for the INTEL Architecture processor instruction set, is the value 66H. If one or more of these operand override prefixes 130 precede an instruction with an opcode susceptible to the presence of such prefixes, the operand size specified by that instruction is toggled from its default size. For example, in this case, a 16-bit instruction which has a 16-bit operand default size will be toggled to specify a 32-bit operand size, and a 32-bit instruction which has a 32-bit operand default size will be toggled to specify a 16-bit operand size.

Similarly, the prefix bytes 114 may include an address override prefix 132 which, for the INTEL Architecture processor instruction set, is the value 67H. If one or more of these address override prefixes 132 precede an instruction with an opcode susceptible to the presence of such prefixes, the default size of the address specifier specified by that instruction is toggled.

Subsequent to the first opcode byte 110 and the optional second opcode byte 112 are the MOD/RM Operand Specifier bytes 116, which indicate the types of source and destination operands that are to be used with this instruction. Virtually any combination of memory and register source and destination operands are possible. An instruction can include zero to two MOD/RM Operand Specifier bytes 116.

An instruction may also include zero to six Address Displacement bytes 118 and zero to four Immediate Constant bytes 120.

In the instruction format of an INTEL Architecture microprocessor, the length of the instruction from the first opcode byte 110 until the last byte of the instruction is determined by examining the first opcode byte 110 and the subsequent three bytes. For ease of reference, a raw instruction 125 is defined to refer to an instruction which either has no prefix bytes or has had its prefix bytes 114 stripped off. In the described embodiment, the raw instruction of the INTEL Architecture instruction set has a length of between one and eleven bytes, inclusive, since not all optional fields can simultaneously have their maximum length in a single instruction.

Figure 3A:
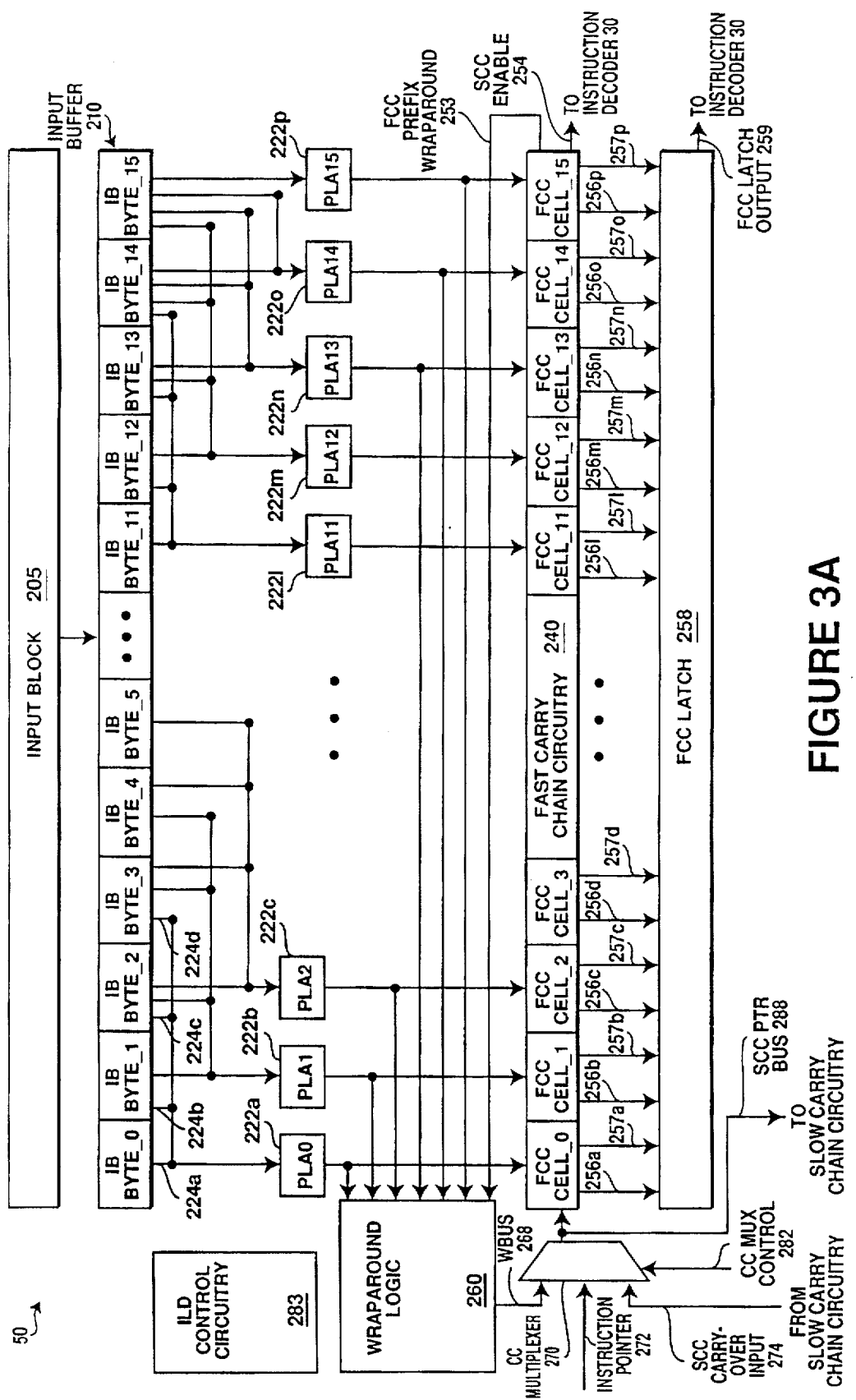
FIG. 3A is a block diagram of the instruction length decoder (ILD) showing the fast carry chain circuitry.

FIG. 3A is a block diagram of the instruction length decoder (ILD) 50 showing the fast carry chain circuitry 240. An input block 205 of instruction code is input into an input buffer 210. In the described embodiment, the input block of instruction code is sixteen bytes in length, and the input buffer is comprised of sixteen bytes: IB byte__0 through IB byte__15.

In the described embodiment, the bytes of the input buffer 210 are coupled by sequential groups of four to a plurality of programmable logic arrays (PLAs)—PLA0 through PLA15 222a–p—whose structures are described subsequently in detail with reference to FIG. 4. The first four sequential bytes of the input buffer 210 starting with the first byte—IB byte__0 through IB byte__3—are coupled to the first PLA–PLA0: IB byte__0 is coupled to PLA0 via a line 224a; IB byte__1 is coupled to PLA0 via a line 224b; IB byte__2 is coupled to PLA0 via a line 224c; and IB byte__3 is coupled to PLA0 via a line 224d.

Each of the next sequential four bytes of the input buffer starting with the second byte—IB byte__1 through IB byte__4—are coupled to the second PLA—PLA1. The subsequent sequential four bytes—IB byte__2 through IB byte__5—are coupled to the third PLA—PLA2, and so forth.

The last four sequential bytes of the input buffer 210—IB byte__12 through IB byte__15—are coupled to PLA12.

In the described embodiment, the bytes of the input buffer 210 are coupled by groups of four since, for the INTEL Architecture processor instruction set, the first four bytes of a raw instruction along with DBIT information (as will be explained with reference to FIG. 4) determine the length of that instruction. Thus, each PLA which receives four input bytes and DBIT information will be able to fully determine the length of a raw instruction starting with the first of the four input bytes. Other couplings of IB bytes and PLAs may be suitable for other architectures.

In the described embodiment, the sixteen PLAs are duplicates of one another, except that the last three PLAs—PLA13, PLA14, and PLA15—are not fully populated, i.e., they do not have inputs from a full set of four sequential bytes of the input buffer 210. Particularly, PLA13 is coupled to IB byte__13, IB byte__14, and IB byte__15; PLA 14 is coupled to IB byte__14 and IB byte__15; and PLA15 is coupled to IB byte__15. The unused inputs of PLA13, PLA14, and PLA15 are grounded. Since PLA13, PLA14, and PLA15 do not have four input bytes, these PLAs may be able to only partially determine the length of a corresponding raw instruction.

Figure 4:
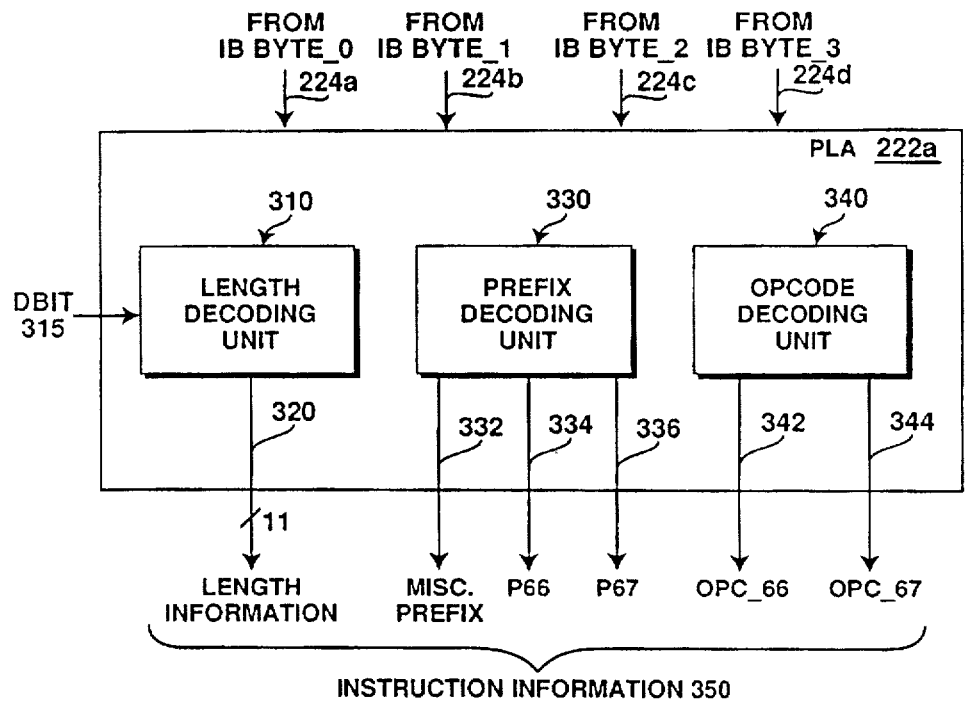
FIG. 4 is a block diagram of the PLA0.

FIG. 4 is a block diagram of the PLA0. In the described embodiment, FIG. 4 is also representative of PLA1 through PLA12, which have inputs from four bytes of the input buffer 210. The PLA0 is coupled to IB byte__0 through IB byte__3 of the input buffer 210 via input lines 224a–d. The PLA0 includes a length decoding unit 310, a prefix decoding unit 330, and an opcode decoding unit 340.

The length decoding unit 310, responsive to the input from the input buffer 210 provides a plurality of decoded length information signals 320 at its output indicative of the length of a raw instruction 125 (FIG. 2) beginning on the byte of the input buffer 210 corresponding to the first of the four input lines, for example, IB byte__0 for PLA0. The decoded length information signals 320 are also dependent upon an input to the length decoding unit 310 from a DBIT signal 315, which indicates the default address size and the default operand size of the instruction, i.e., 16-bits or 32-bits for the described embodiment. In the described embodiment, the DBIT signal 315 is provided from a register file (not shown) external to the ILD 50. A DBIT signal is also provided to each of the other PLAs. In the described embodiment, the decoded length information signals 320 comprise eleven decoded signal lines. At any time, only one signal line of the eleven decoded length information signals 320 is asserted, specifying a raw instruction length within the range from one to eleven. Other numbers of decoded length information signal lines 320 will be suitable for use in architectures with other maximum instruction lengths.

The prefix decoding unit 330, responsive to the input lines, provides a miscellaneous prefix signal 332, an operand override prefix (P66) signal 334, and an address override prefix (P67) signal 336 at its output. The miscellaneous prefix signal 332 indicates the presence of prefixes other than the operand override prefix 130 and the address override prefix 132. The P66 signal 334 indicates the presence of the operand override prefix 130, and the P67 signal 336 indicates the presence of the address override prefix 132. Other outputs from prefix decoding unit 330 will be suitable for other architectures, as determined by the prefixes allowed in their respective instruction sets.

The opcode decoding unit 340 provides two outputs: an OPC__66 signal 342 and an OPC__67 signal 344. The OPC__66 signal 342 indicates that the opcode decoding unit 340 detected an opcode which is a function of the operand override prefix 130; if such an opcode and an operand override prefix are both present in the same instruction, then the operand size of that instruction is changed to an alternate predetermined length, as was described with respect to FIG. 2. Similarly, the OPC__67 signal 344 indicates that the opcode decoding unit 340 detected an opcode which is a function of the address override prefix 132; if such an opcode and an address override prefix are both present in the same instruction, then the default address size of that instruction is changed to an alternate predetermined length.

Thus, the PLA output of instruction information 350 comprises the decoded length information signals 320, the prefix information signals 332, 334, and 336, and the opcode information signals 342 and 344.

Returning to FIG. 3A, the outputs of the plurality of PLAs are coupled to fast carry chain circuitry 240. In the described embodiment, the fast carry chain circuitry 240 comprises sixteen fast carry chain (FCC) cells—FCC cell__0 through FCC cell__15. Each of the PLAs 222a–p is coupled to one of the FCC cells. The PLA0 is coupled to supply instruction information comprising length information, prefix information, and opcode information to the first FCC cell—FCC cell__0. The PLA1 is coupled to supply instruction information to the second FCC cell—FCC cell__1. The remainder of the PLAs 222a–p are coupled to supply instruction information to the remaining FCC cells in a similar manner.

Each of the FCC cells corresponds to the particular PLA to which it is coupled. Additionally, each PLA corresponds to the first byte of the input bytes to which it is coupled. Thus, each of the FCC cells also corresponds to one of the bytes of the input buffer 210.

The fast carry chain circuitry 240 provides a FCC prefix wraparound 253 as one output. The FCC prefix wraparound provides information indicative of the detection of the operand override prefix 130 and the address override prefix 132. The fast carry chain circuitry also provides a SCC Enable signal 254 as an output. The FCC prefix wraparound 253 will be discussed in further detail later in reference to FIG. 10. The SCC Enable signal 254 will be discussed in further detail later with reference to FIGS. 3B and 6.

The fast carry chain circuitry provides START marks 256a–p, indicative of the beginning bytes of raw instructions, and END marks 257a–p, indicative of the end bytes of raw instructions. FCC cell__0 provides the outputs of the START mark 256a and the END mark 257a. FCC cell__1 provides the outputs of the START mark 256b and the END mark 257b. Similarly, FCC cell__2 through FCC cell__15 provide the outputs of the START marks 256c–p and the END marks 257c–p.

The START marks 256a–p and END marks 257a–p are coupled to a FCC latch 258, which latches the START marks 256a–p and END marks 257a–p from the fast carry chain circuitry. The FCC latch is coupled to provide an output vector of START marks and END marks which are passed via a FCC latch output 259 through to the rotator 60 and then to the instruction decoder 30, as shown in FIG. 1.

The first three PLAs—PLA0, PLA1, and PLA2—and the last three PLAs—PLA13, PLA14, and PLA15—are coupled to a wraparound logic 260. The wraparound logic 260 is coupled through a WBUS 268 to provide a first input to a carry chain (CC) multiplexer 270.

The CC multiplexer 270 is also coupled to receive an instruction pointer 272 from instruction pointer logic located externally to the ILD 50. The instruction pointer input indicates the FCC cell corresponding to the initial byte of the input buffer 210 at which instruction length processing in the fast carry chain circuitry 240 is to begin. Branching circuitry for determining the instruction pointer input is well-known and is not pertinent to the invention, and is therefore not discussed in the present specification.

The CC multiplexer 270 is coupled to receive a third input from a slow carry chain (SCC) carryover input 274, which is provided from slow carry chain circuitry 280, described in further detail next. The CC multiplexer is controlled by a CC MUX control signal 282, which is provided by ILD control circuitry 283. The CC multiplexer 270 is coupled to provide pointer information to the fast carry chain circuitry 240.

Figure 3B:
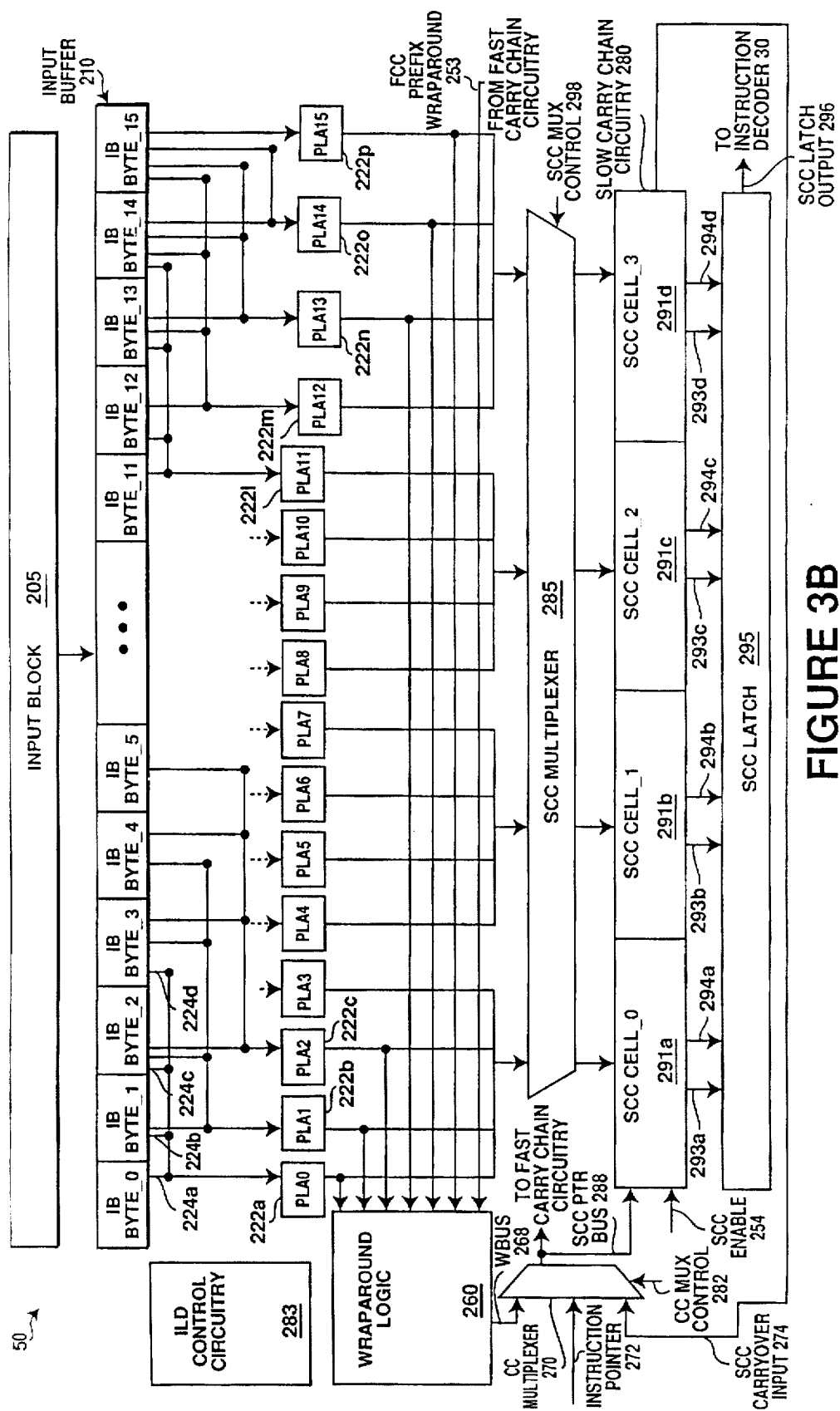
FIG. 3B is a block diagram of the instruction length decoder (ILD) showing the slow carry chain circuitry.

FIG. 3B is a block diagram of the instruction length decoder (ILD) 50 showing the slow carry chain circuitry 280. The slow carry chain circuitry 280 is enabled by an input from the SCC Enable signal 254 which is provided by the fast carry chain circuitry 240. The slow carry chain circuitry takes over from the fast carry chain circuitry 240 because of length modifying behavior of the instructions being decoded, as will become clear later. Due to this length modifying behavior, the fast carry chain circuitry 240 is not able to process the instruction length decoding while running at full speed. Instead, the slow carry chain circuitry 280 is used to process the instruction length decoding at a slower rate than that of the fast carry chain circuitry 240.

Each of the plurality of PLAs is also coupled to a slow carry chain (SCC) multiplexer 285 which, in the described embodiment, is a four-to-one multiplexer. Particularly, PLA0 through PLA3 are coupled to supply instruction information comprising length information, prefix information and opcode information to the SCC multiplexer 285. Similarly, PLA4 through PLA7, PLA8 through PLA11, and PLA12 through PLA15 are coupled to supply instruction information to the SCC multiplexer.

The slow carry chain circuitry 280 comprises four slow carry chain (SCC) cells—SCC cell__0 through SCC cell__3. The SCC multiplexer 285 is coupled to provide an input to each of the SCC cells—SCC cell__0 through SCC cell__3.

The slow carry chain circuitry is also coupled to receive an input pointer from the CC multiplexer 270 via a SCC PTR bus 288.

The slow carry chain circuitry provides START marks 293a–d and END marks 294a–d similar to the fast carry chain circuitry. Each of the SCC cells provides the output of one START mark and one END mark.

The START marks 293a–d and END marks 294a–d of the slow carry chain circuitry are coupled to a SCC latch 295, which latches the START marks 293a–d and END marks 294a–d and provides a SCC latch output 296 to the instruction decoder 30 (FIG. 1) via the rotator 60.

The ILD control circuitry 283 is coupled to the SCC multiplexer 285 by a SCC MUX control signal 298 which selects the output of the SCC multiplexer 285.

In the described embodiment, the slow carry chain circuitry processes the 16-byte input buffer in four iterations. Upon the first iteration, the ILD control circuitry 283 selects the first set of PLA input PLA0 through PLA3 via the SCC MUX control signal 298. With the first set of PLA input selected, PLA0 provides its instruction information to SCC cell_0. Similarly, PLA1 provides its instruction information to the SCC cell_1; PLA2 provides its instruction information to the SCC cell_2; and PLA3 provides its instruction information to the SCC cell_3. The SCC cells generate START marks 293a–d and END marks 294a–d, which are subsequently latched by the SCC latch 295.

On the second iteration, the ILD control circuitry 283 selects the second set of PLA input—PLA4 through PLA7—via the SCC MUX control signal 298. With the second set of PLA input selected, PLA4 provides its instruction information to the SCC cell_0. Similarly, PLA5 provides its instruction information to the SCC cell_1; PLA6 provides its instruction information to the SCC cell_2; and PLA7 provides its instruction information to the SCC cell_3. The SCC cells generate START marks 293a–d and END marks 294a–d, which are subsequently latched by the SCC latch 295.

Similarly, on the third iteration, the ILD control circuitry 283 selects the third set of PLA input via the SCC MUX control signal 298 to provide instruction information from PLA8 through PLA11 to the SCC cells. On the fourth iteration, the ILD control circuitry 283 selects the fourth set of PLA input via the SCC MUX control signal 298 to provide instruction information from PLA12 through PLA15 to the SCC cells. The SCC latch 295 latches the START marks 293a–d and END marks 294a–d provided by the SCC cells after each iteration. After all four iterations, the SCC latch 295 provides an output vector of START marks 293a–d and END marks 294a–d to the rotator 60 and the instruction decoder 30 (FIG. 1) at a SCC latch output 296.

Figure 5:
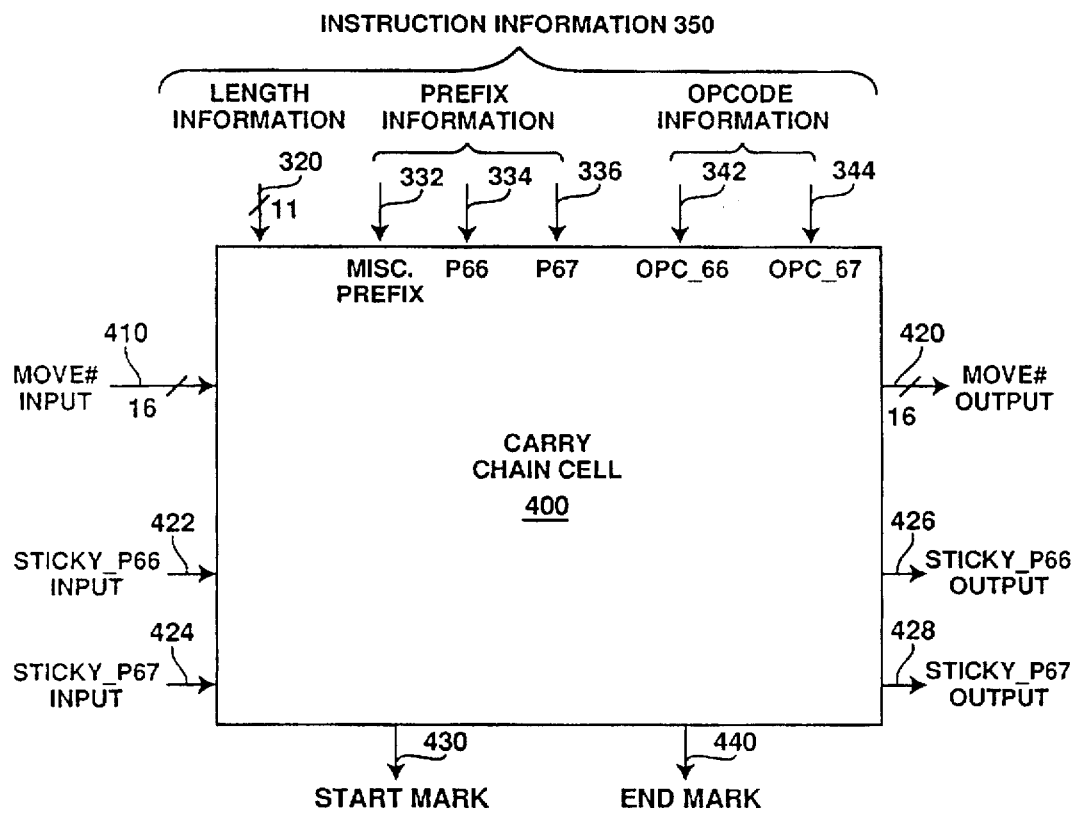
FIG. 5 is a block diagram of a carry chain cell representative of each of the FCC cells and the SCC cells.

FIG. 5 is a block diagram of a carry chain cell 400 representative of each of the FCC cells and the SCC cells. The carry chain cell 400 receives instruction information 350 inputs originating from one of the PLAs including: the decoder length information signals 320, the miscellaneous prefix signal 332, the P66 signal 334, the P67 signal 336, the OPC_66 signal 342, and the OPC_67 signal 344.

Additionally, the carry chain cell 400 has a move# input 410 which comprises sixteen decoded signals such that at any time only one of the sixteen signals is asserted. The move# input 410 comes from the preceding carry chain cell except for the case of the first carry chain cells FCC cell_0 and SCC cell_0, in which case the input comes from the CC multiplexer 270. The move# input 410 indicates the next carry chain cell of the FCC cells (if processing is in the fast carry chain circuitry 240) or the SCC cells (if processing is in the slow carry chain circuitry 280) at which instruction length processing is to continue. The move# input 410 will be discussed in further detail with reference to FIGS. 6 and 7.

The carry chain cell 400 provides a move# output 420 which indicates a next carry chain cell of the FCC cells (if processing is in the fast carry chain circuitry 240) or the SCC cells (if processing is in the slow carry chain circuitry 280) at which instruction length processing is to continue. The move# output 420 will be discussed in further detail with reference to FIGS. 6 and 7.

The carry chain cell 400 receives a sticky_P66 input signal 422, which indicates a prior detection of an operand override prefix 130 by another carry chain cell 400. The carry chain cell 400 also receives a sticky_P67 input signal 424, which indicates a prior detection of an address override prefix 132 by another carry chain cell 400. For the case of the first carry chain cells i.e., FCC cell_0 or SCC cell_0 the CC multiplexer 270 provides the sticky_P66 input 422 and the sticky_P67 input 424 from the SCC carryover input 274 or from the FCC prefix wraparound signal 253 via the wraparound logic 260. The sticky_P66 input signal 422 and the sticky_P67 input signal 424 will be discussed in further detail later with reference to FIGS. 6 and 7.

The carry chain cell 400 provides a sticky_P66 output signal 426, which indicates the detection of an operand override prefix 130 by the current carry chain cell or a prior detection of an operand override prefix 130 by another carry chain cell. The carry chain cell also provides a sticky_P67 output signal 428, which indicates the prior detection of an address override prefix 132 by the current carry chain cell or a prior detection of an address override prefix 132 by another carry chain cell.

The carry chain cell also provides, as outputs, a START mark 430 and an END mark 440. The START mark 430 of FIG. 5 is representative of the START marks 256a–p from the FCC cells and the START marks 293a–d from the SCC cells. The END mark 440 is representative of the END marks 257a–p from the FCC cells and the END marks 294a–d from the SCC cells.

Figure 6:
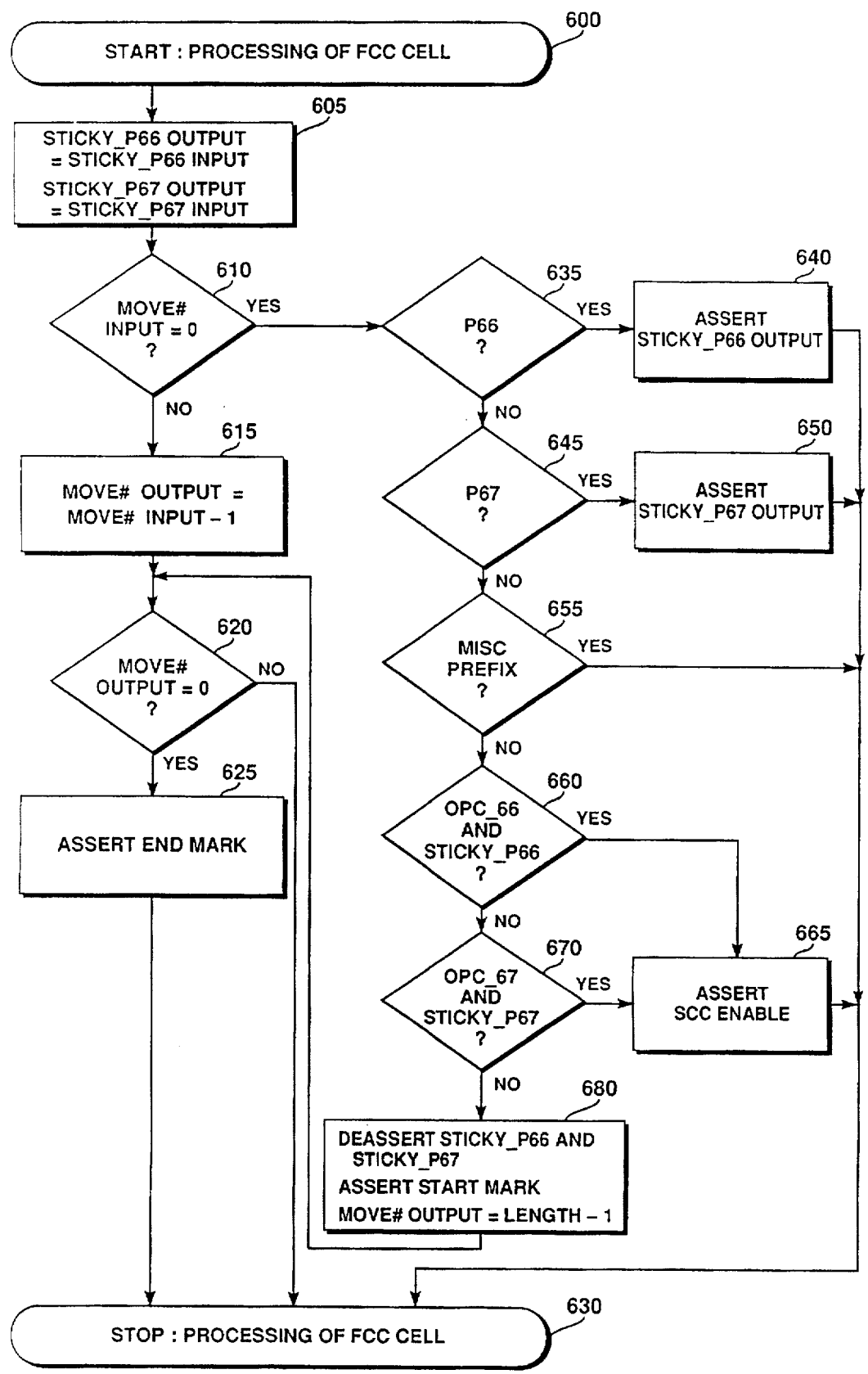
FIG. 6 is a flowchart showing the steps taken in processing one of the FCC cells.

FIG. 6 is a flowchart showing the steps taken in processing one of the FCC cells. The FCC cells are processed serially starting with FCC cell_0 and ending with FCC cell_15. However, processing of the FCC cells within the fast carry chain circuitry 240 is aborted if the SCC Enable signal 254 is asserted, as will be discussed.

The flowchart of FIG. 6 references the carry chain cell 400, which is representative of the FCC cells. The decoded length information signal 320, prefix information input 332, 334, and 336, and opcode information input 342 and 344 are representative of the inputs of the FCC cells from the PLAs 222a–p. The START mark 430 is representative of the START marks 256a–p of the FCC cells, and the END mark 440 is representative of the END marks 257a–p of the FCC cells.

From the starting block 600, operation moves to an operation block 605. At the operation block 605, the sticky_P66 output 426 is set to the same state as the sticky_P66 input 422. Thus, if the sticky_P66 input 422 is asserted, then the sticky_P66 output 426 will be asserted. Similarly, the sticky_P67 output 428 is set to the same state as the sticky_P67 input 424. From the operation block 605, operation moves to a decision block 610.

At the decision block 610, a determination is made as to whether the move# input 410 to the current FCC cell indicates a value of zero. If the move# input 410 does not indicate a zero value then operation moves to an operation block 615. At the operation block 615, the move# output 420 is set to the move# input 410 value less one. From the operation block 615, operation moves to the decision block 620.

At the decision block 620, a determination is made as to whether the move# output 420 value is zero. If the move# output 420 value is zero, then operation moves to an operation block 625. At the operation block 625, the END mark 440 is asserted. From the operation block 625, operation moves to a flowchart end block 630.

However, at the decision block 620, if the value of the move# output 420 is not zero, then operation also moves to the flowchart end block 630.

At the flowchart block 630, processing of the current FCC cell terminates.

However, if at the decision block 610, the value of the move# input 410 is zero, then operation moves to a decision block 635.

At the decision block 635, a determination is made as to whether the instruction information input to the current carry chain cell 400 indicates an operand override prefix 130, as indicated by assertion of the P66 signal 334. If there is indication of such a prefix, then operation moves to an operation block 640. At the operation block 640, the sticky__P66 output 426 is asserted. From the operation block 640, operation moves to the flowchart end block 630.

However, at the decision block 635, if there is no indication of the presence of the operand override prefix 130, then operation moves to a decision block 645.

At the decision block 645, a determination is made as to whether the instruction information input to the current carry chain cell 400 indicates an address override prefix 132, as indicated by assertion of the P67 signal 336. If there is such a prefix, then operation moves to an operation block 650. At the operation block 650, the sticky__P67 output 428 is asserted. From the operation block 650, operation moves to the flowchart end block 630.

However, at the decision block 645, if there is no indication of the presence of the address override prefix 132, then operation moves to a decision block 655.

At the decision block 655, if there is an indication of the presence of a prefix other than the operand override prefix 130 and the address override prefix 132, then operation moves to the flowchart end block 630.

However, at the decision block 655, if there is no indication of the presence of a prefix other than the operand override prefix 130 and the address override prefix 132, then operation moves to a decision block 660.

At the decision block 660, a determination is made as to whether both the OPC__66 signal 342 indicates that an opcode was detected which is a function of the operand override prefix 130 and the sticky__P66 input 422 is asserted. If these two conditions are met, then operation moves to an operation block 665.

At the operation block 665, the SCC Enable signal 254 is asserted by the fast carry chain circuitry 240. Serial processing within the fast carry chain circuitry is now aborted. From the operation block 665, operation moves to the flowchart end block 630.

However, at the operation block 660, if the dual condition of both the OPC__66 signal 342 and the sticky__P66 input 422 being asserted is not met, then operation moves to the decision block 670.

At the decision block 670, a determination is made as to whether both the OPC__67 signal 344 indicates that an opcode was detected which is a function of the address override prefix 132 and the sticky__P67 input 424 is asserted. If these two conditions are met, then operation moves to the operation block 665.

However, at the operation block 670, if the dual condition of the OPC__67 signal 344 and the sticky__P67 input 424 being asserted is not met, then operation moves to an operation block 680.

At the operation block 680, the sticky__P66 output 426 and the sticky__P67 output 428 are deasserted, the START mark 430 is asserted, and the move# output 420 is set to the value of the decoded length information signal 320 provided to the carry chain cell less one. From the operation block 680, operation moves to the decision block 620.

Figure 7:
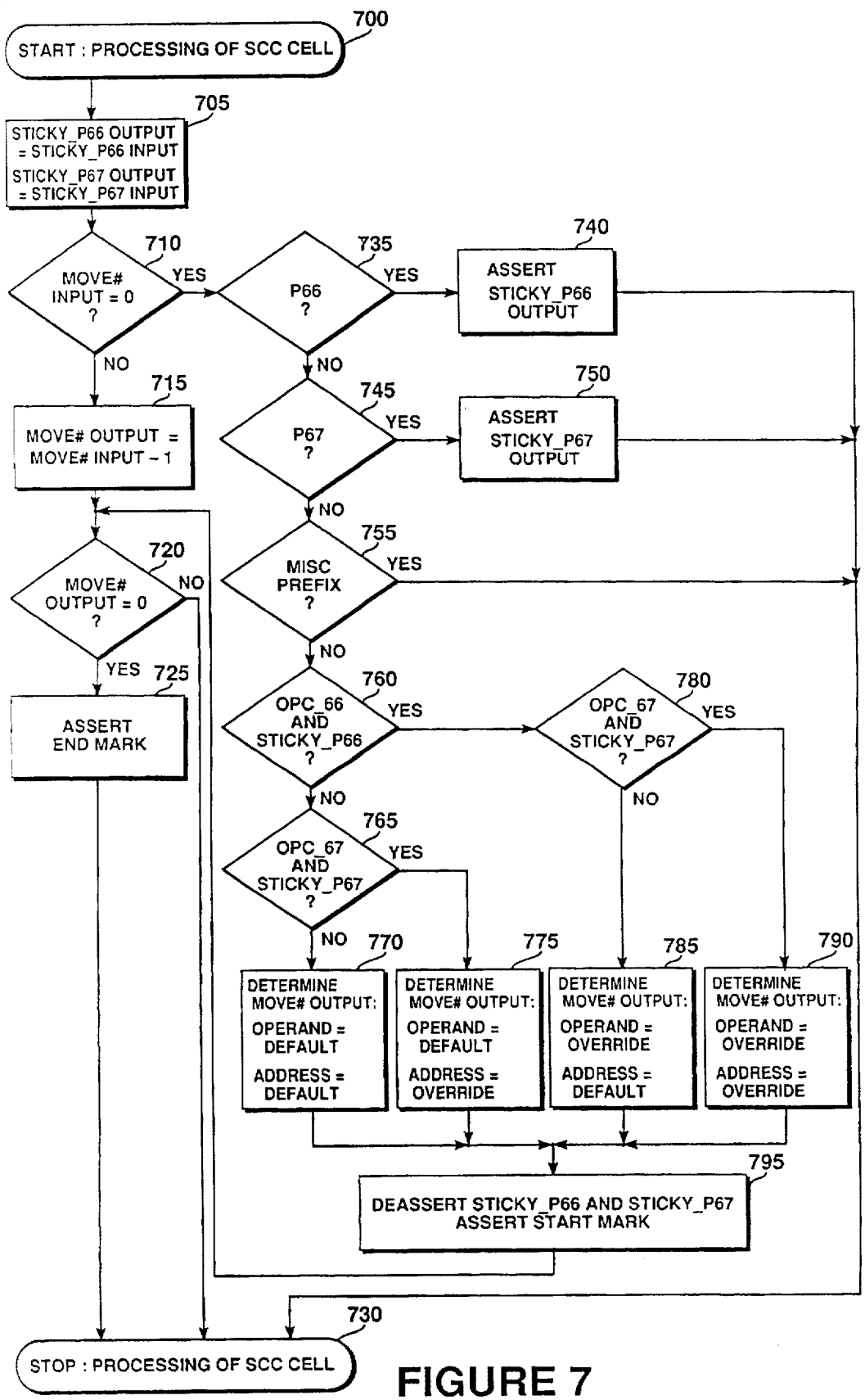
FIG. 7 is a flowchart showing the steps taken in processing one of the SCC cells.

FIG. 7 is a flowchart showing the steps taken in processing one of the SCC cells. The SCC cells are processed serially starting with SCC cell__0 and ending with SCC cell__3. In the described embodiment, processing a 16-byte input buffer 210 in the slow carry chain circuitry 280 requires four iterations of serially processing the instruction information 350 inputs to the SCC cells, as will be discussed later with reference to FIG. 12.

The flowchart of FIG. 7 references the carry chain cell 400, which is representative of the SCC cells. The decoded length information signal 320, prefix information input 332, 334 and 336, and opcode information input 342 and 344 are representative of the inputs of the SCC cells from the SCC multiplexer 285. The START mark 430 is representative of the START marks 293a–d of the SCC cells, and the END mark 440 is representative of the END marks 294a–d of the SCC cells.

FIG. 7 is the same as FIG. 6 up to decision block 760, so please see the description of FIG. 6 for details. At the decision block 760, a determination is made as to whether both the OPC__66 signal 342 and the sticky__P66 input 422 are asserted. If these two conditions are not met, then operation moves to a decision block 765.

At the decision block 765, a determination is made as to whether both the OPC__67 signal 344 and the sticky__P67 input 424 are asserted. If these two conditions are not met, then operation moves to an operation block 770, at which the move# output 420 is calculated assuming a default operand size and a default address specifier size.

However, at the decision block 765, if both the OPC__67 input 344 and the sticky__P67 input 424 are asserted, then operation moves to an operation block 775, at which the move# output 420 is calculated assuming a default operand size and an override address specifier size.

However, at the decision block 760, if both the OPC__66 input 342 and the sticky__P66 input 422 are asserted, then operation moves to a decision block 780, at which a determination is made as to whether both the OPC__67 signal 344 and the sticky__P67 input 424 are asserted. If these two conditions are not met, then operation moves to an operation block 785, at which the move# output 420 is calculated assuming an override operand size and a default address specifier size.

However, at the decision block 780, if both the OPC__67 input 344 and the sticky__P67 input 424 are asserted, then operation moves to an operation block 790 at which the move# output 420 is calculated assuming an override operand size and an override address specifier size.

From the operation blocks 770, 775, 785, and 790, operation moves to an operation block 795, at which the sticky__P66 output and the sticky__P67 output are deasserted, and the START mark is asserted. From the operation block 795, operation moves to the decision block 720.

Figure 8:
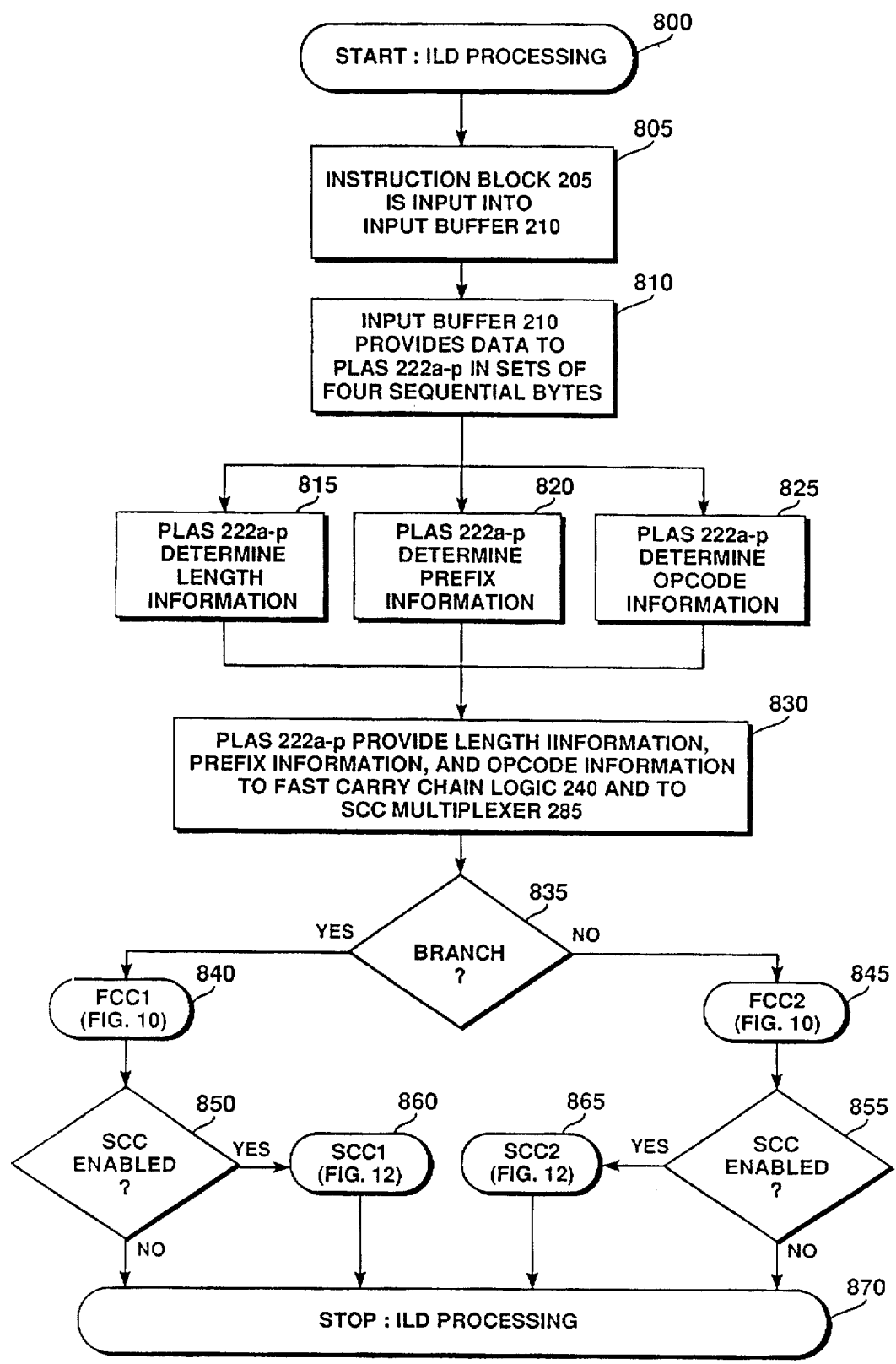
FIG. 8 is a flowchart showing the steps in processing an input block of instruction code in the instruction length decoder (ILD).

FIG. 8 is a flowchart showing the steps in processing an input block 205 in the ILD 50. FIG. 8 includes operations which are defined further in subsequent description of FIGS. 10 and 12, as will be described.

Starting from a flowchart block 800, the instruction length determination begins. From the flowchart block 800, operation moves to an operation block 805, at which the input block 205 (FIG. 2) of instruction code is input into the input buffer 210. From the operation block 805, operation continues at an operation block 810, at which the input buffer 210 provides data to each of the plurality of PLAs 222a–p in sets of four sequential bytes, as previously described with reference to FIG. 3A. From the operation block 810, operation continues in parallel at operation blocks 815, 820, and 825, corresponding to the three units of the PLA: the length decoding unit 310, the prefix decoding unit 330, and the opcode decoding unit 340.

At the operation block 815, the plurality of PLAs determine length information from the corresponding four PLA inputs. The length determination is performed within the length decoding unit 310, assuming that the sequential input bytes are the first bytes of a raw instruction.

At the operation block 820, the plurality of PLAs determine prefix information from the corresponding four PLA inputs. This prefix determination includes detecting whether the instruction being examined includes an operand override prefix 130, an address override prefix 132, or a different prefix.

At the operation block 825, the plurality of PLAs determine opcode information from the corresponding four PLA inputs. This opcode determination includes detecting whether the instruction being examined includes an opcode which is a function of the operand override prefix 130 or an opcode which is a function of the address override prefix 132.

From the operation blocks 815, 820, and 825, operation moves to an operation block 830, at which the plurality of PLAs provide their length information, prefix information, and opcode information to the fast carry chain circuitry 240 and to the SCC multiplexer 285. From the operation block 830, operation moves to a decision block 835.

At the decision block 835, the ILD control circuitry 283 determines whether there has been a control transfer, which can occur by means of a branch prediction or misprediction. If there has been a control transfer, then operation moves to a FCC1 flowchart block 840. If there has not been a control transfer, then operation moves to a FCC2 flowchart block 845.

The FCC1 flowchart block 840 and the FCC2 flowchart block 845 are subroutines which redirect flowchart control to FIG. 10, which shows flowchart operation in the fast carry chain circuitry and which will be described in detail later. The fast carry chain circuitry determines the START marks 256a–p and the END marks 257a–p by serially processing the inputs to each of the FCC cells. However, if the input buffer 210 includes an instruction which includes an instruction length-varying prefix paired with an opcode which is a function of the instruction length-varying prefix, then processing in the fast carry chain circuitry 240 is aborted, and the SCC Enable signal 254 is asserted. Following flowchart processing in FIG. 10, flowchart control returns to a subsequent flowchart block in FIG. 8. From the FCC1 flowchart block 840, operation moves to a decision block 850, and from the FCC2 flowchart block 845, operation moves to a decision block 855.

At the decision block 850, a determination is made as to whether the slow carry chain circuitry 280 has been enabled. This is evidenced by the fast carry chain circuitry 240 asserting the SCC Enable signal 254. If the SCC Enable output signal is asserted then operation moves to a SCC1 flowchart block 860.

Similarly, at the decision block 855, a determination is made as to whether the slow carry chain circuitry 280 has been enabled. If the SCC Enable signal 254 is asserted then operation moves to a SCC2 flowchart block 865.

The SCC1 flowchart block 860 and the SCC2 flowchart block 865 are subroutines which redirect flowchart control to FIG. 12, which shows flowchart operation in the slow carry chain circuitry 280 and which will be described in detail later. The slow carry chain circuitry handles the case in which the input buffer 210 includes an instruction which includes a length-varying prefix combined with an opcode which is a function of the length-varying prefix. The slow carry chain circuitry operates at a slower rate than the fast carry chain circuitry to allow extra time for handling length modifying behavior. The slow carry chain circuitry determines its START marks 293a–d and the END marks 294a–d by serially processing the inputs to each of the SCC cells. Following flowchart processing in FIG. 12, flowchart control returns to a subsequent flowchart block in FIG. 8. From the flowchart blocks 860 and 865, operation moves to a flowchart block 870. Additionally, from both the decision blocks 850 and 855, if the slow carry chain circuitry 280 is not enabled, then operation moves to the flowchart block 870.

At the flowchart block 870, the processing of one input block of instruction code in the ILD terminates. This process is repeated serially for subsequent input blocks of instruction code. Note that in the described embodiment, the input block of instruction code may not include a complete instruction, since instructions can span into a subsequent input block of instruction code.

Figure 9:
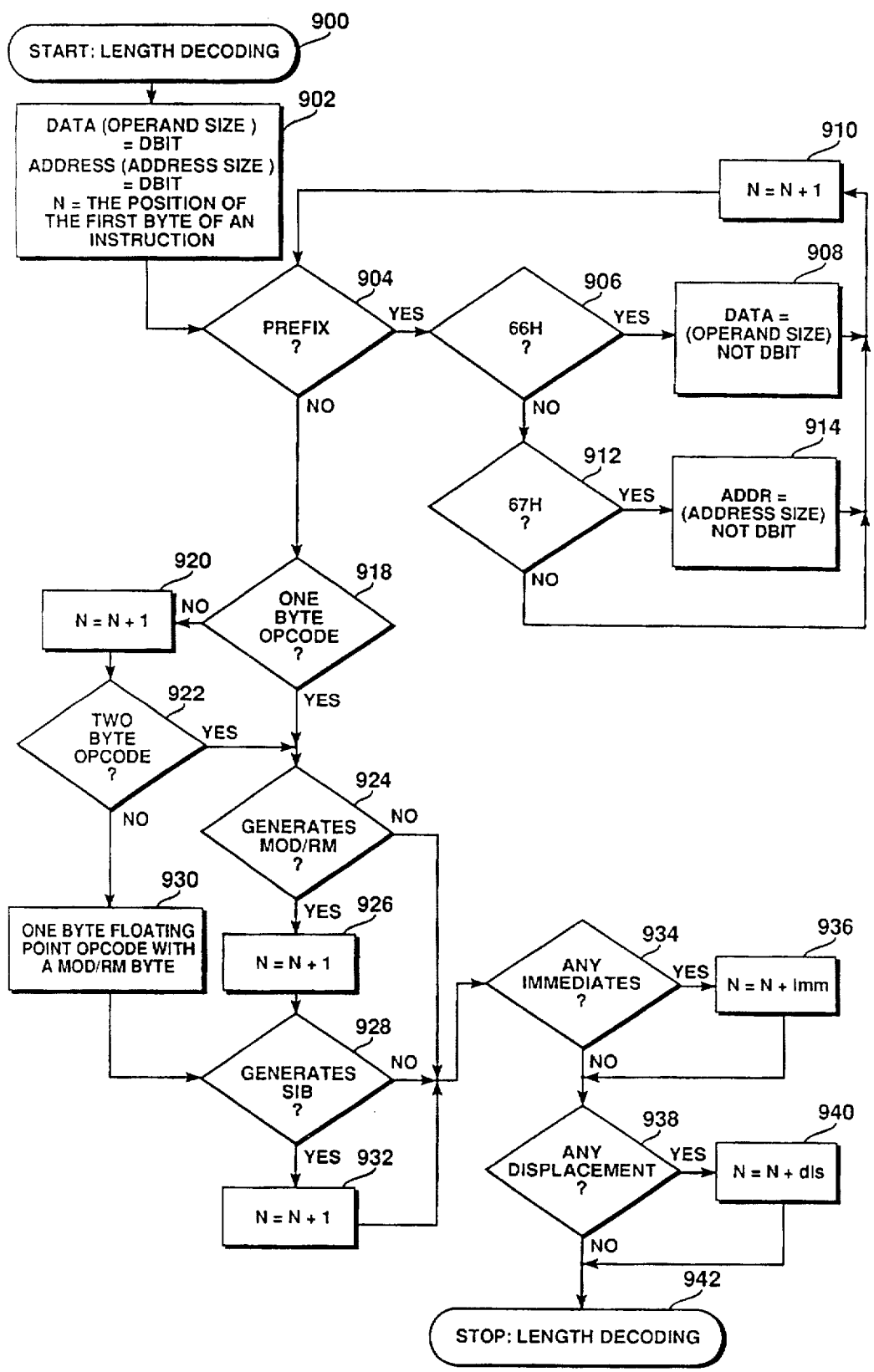
FIG. 9 is a flowchart showing the steps for determining the length of an instruction.

FIG. 9 is a flowchart showing the steps for determining the length of an instruction. The flowchart implementation of FIG. 9 performs the steps similar to those performed by the length decoding unit 310 in determining the length of an instruction. The length decoding unit 310, however, determines the length assuming that its input starts with the first byte of a raw instruction. Thus, the length decoding unit 310 does not look for prefix bytes. Instead, this function is performed by the prefix decoding unit 330.

Starting from a flowchart block 900, the instruction length decoding begins. From the flowchart block 900, operation moves to an operation block 902, at which the data operand size and the address operand size are initialized to their default values. A temporary variable N is set to the position of the first byte of the instruction.

From the operation block 902, operation moves to a decision block 904, at which, if the current byte being examined is a prefix byte 114 (FIG. 2), then operation moves to a decision block 906. At the decision block 906, if the current byte is an operand override prefix 130, which has the value 66H for the described embodiment, then operation moves to an operation block 908, at which the operand data size is changed to the override value (not the default value). (In the described embodiment, the slow carry chain circuitry performs the function described in the operation block 908.) Operation then moves to an operation block 910. However, if at the decision block 906, the current byte is not an operand override prefix 130, then operation moves to a decision block 912.

At the decision block 912, if the current byte being examined is an address override prefix 132, which has the value 67H for the described embodiment, then operation moves to an operation block 914, at which the address size is changed to the override value (not the default value). (In the described embodiment, the slow carry chain circuitry performs the function described in the operation block 914.) However, if from the decision block 912, the current byte is not an address override prefix 132, then operation moves to an operation block 910.

At the operation block 910, the pointer to the byte being examined is incremented so that the next sequential byte is now examined. From the operation block 910, operation returns to the decision block 904.

From the operation block 904, if the byte being examined is not a prefix, then operation moves to an operation block 918, at which a determination is made as to whether this instruction is a one byte opcode. If this instruction is not a one byte opcode then operation moves to an operation block 920, at which the byte pointer is incremented by one byte to point to the next sequential byte. From the operation block 920, operation moves to a decision block 922.

At the decision block 922, a determination is made as to whether this is a two byte opcode. If this instruction is a two byte opcode then operation moves to a decision block 924.

However, if at the decision block 918, the instruction is a one byte opcode, then operation moves to a decision block 924, at which a determination is made as to whether the instruction includes a MOD/RM operand specifier byte 116 (FIG. 2). If the instruction includes a MOD/RM operand specifier byte 116, then operation moves to an operation block 926, at which the byte pointer is incremented by one byte. From the operation block 926, operation moves to a decision block 928.

Returning to the decision block 922, if the instruction is not a two byte opcode, then operation moves to an operation block 930, which indicates this instruction is a one byte floating point opcode with a MOD/RM operand specifier byte 116. From the operation block 930, operation moves to the decision block 928.

At the decision block 928, a determination is made whether the instruction includes a SIB byte, i.e. a second MOD/RM byte. If the instruction does include a SIB byte, then operation moves to operation block 932, at which the byte pointer is incremented by one byte. From the operation block 932, operation moves to a decision block 934.

Returning to the decision block 924, if the instruction does not include a MOD/RM byte then operation moves to the decision block 934. Similarly, from the decision block 928, if the instruction does not include a SIB byte, then operation moves to the decision block 934.

At the decision block 934, a determination is made as to whether the instruction includes any Immediate Constant Bytes. If any immediate bytes 120 are included then operation moves to an operation block 936, at which the byte pointer is incremented by the number of immediate bytes in the instruction. From the operation block 936, operation moves to a decision block 938.

However, at the decision block 934, if there are no immediate bytes 120 in the instruction, then operation moves to the decision block 938, at which a determination is made whether the instruction has any address displacement bytes. If there are address displacement bytes then operation moves to an operation block 940, at which the byte pointer is incremented by the number of displacement bytes in the instruction. From the operation block 940, operation moves to a flowchart block 942.

However, if at the decision block 938, a determination is made that there are no address displacement bytes in the instruction, then operation moves to the flowchart block 942, at which operation terminates.

Figure 10:
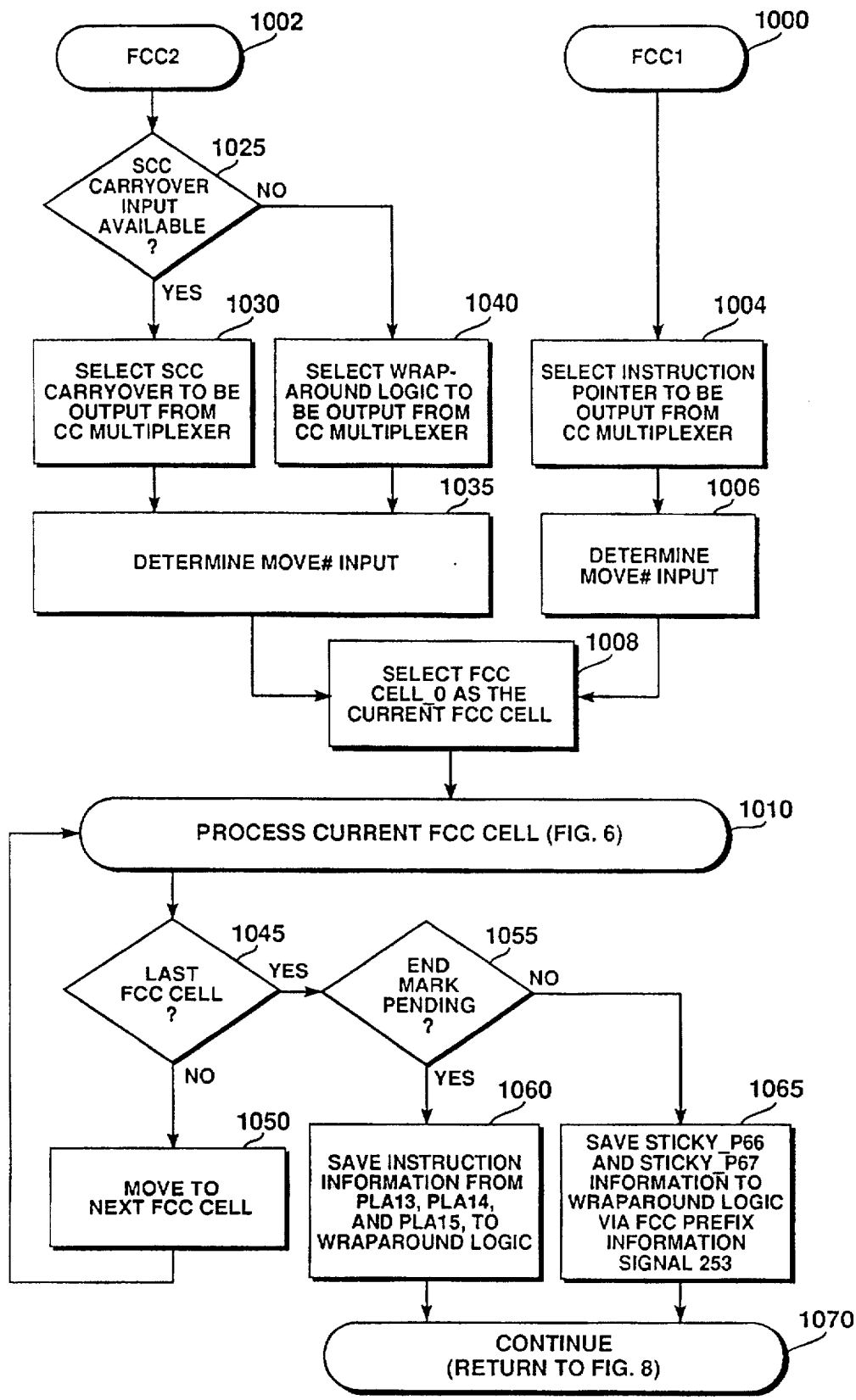
FIG. 10 is a flowchart of the steps taken by the fast carry chain circuitry in processing an input block of instruction code in the ILD.

FIG. 10 is a flowchart of the steps taken by the fast carry chain circuitry. FIG. 10 is a subroutine of FIG. 8; i.e., flowchart execution begins in FIG. 8, branches to FIG. 10, then resumes in FIG. 8.

Processing in the fast carry chain circuitry is done serially, in a domino fashion, such that processing starts with FCC cell_0, then continues with the FCC cell , and so forth. The following description references a current FCC cell, which is the FCC cell at which processing is currently being performed. Each FCC cell corresponds to one of the bytes of the input buffer 210. Accordingly, once the length of a raw instruction is determined, processing of the instruction information input to the FCC cells corresponding to the bytes between the first byte and last byte of the raw instruction is skipped, since no length determination need be performed on these bytes.

There are two starting points for FIG. 10: starting block FCC1 1000 and starting block FCC2 1002. Operation starts at the starting block FCC1 1000 when processing of the input blocks has a control transfer due to a branch prediction or misprediction. Operation starts at the starting block FCC2 1002 when processing of the input blocks continues sequentially without a control transfer, i.e., without a branch.

From starting block FCC1 1000, operation moves to an operation block 1004, at which the instruction pointer 272 is selected by the CC MUX control signal 282 as the output of the CC multiplexer 270. From the operation block 1004, operation moves to an operation block 1006, at which the move# input 410 is determined from the output of the CC multiplexer 270. The move# input 410 indicates the FCC cell at which processing of the instruction information input from one of the PLAs is to begin. The move# input can specify any one of the sixteen FCC cells via its sixteen decoded signals. From the operation block 1006, operation moves to an operation block 1008, at which the FCC cell_0 is selected as the current FCC cell. From the operation block 1008, operation moves to an operation block 1010.

From the starting block FCC2 1002, operation moves to a decision block 1025, at which a determination is made whether there is an input from the SCC carryover input 274 available. If there is an SCC carryover signal available, then operation moves to the operation block 1030, at which the SCC carryover signal is selected by the CC MUX control signal 282 as the output of the CC multiplexer 270. From the operation block 1030, operation moves to an operation block 1035.

However, at the decision block 1025, if there is no SCC carryover input available, then operation moves to an operation block 1040, at which the wraparound logic 260 is selected by the CC MUX control signal as the output of the CC multiplexer 270. From the operation block 1040, operation moves to the operation block 1035.

At the operation block 1035, the move# input is determined from the output of the CC multiplexer. The move# input indicates the FCC cell at which processing of the instruction information input is to continue; the instruction information input to the interim FCC cells is not processed. Up to eleven FCC cells can be skipped corresponding to the eleven byte maximum length of a raw instruction. Eleven of the sixteen decoded signals of the move# input are used to indicate a FCC cell up to eleven FCC cells away from the current FCC cell. (The other five of the sixteen decoded signals are used in the case of a control transfer, in which all sixteen of the decoded signals can indicate a FCC cell up to sixteen FCC cells away from the current FCC cell, as is indicated in operation block 1006.) From the operation block 1035, operation moves to the operation block 1008, at which the FCC cell_0 is selected as the current FCC cell. From the operation block 1008, operation moves to the flowchart block 1010.

At the flowchart block 1010, the current FCC cell is processed as is described in FIG. 6, after which, operation moves to the decision block 1045.

At the decision block 1045, a determination is made as to whether the current FCC cell is the last FCC cell, i.e., FCC cell_15, in the described embodiment. If the current FCC cell is not the last FCC cell, then operation moves to the operation block 1050, at which the next FCC cell is selected as the current FCC cell. From the operation block 1050, operation moves back to the flowchart block 1010.

However, at the decision block 1045, if the current FCC cell is the last FCC cell, then operation moves to the decision block 1055, at which a determination is made as to whether there is an END mark pending. If there is an END mark pending, then operation moves to an operation block 1060, at which the instruction information from the last three PLAs—PLA13, PLA14, and PLA15—is saved to the wraparound logic 260. This instruction information is used to process instruction length decoding of the next sequential input block of instruction code (i.e., the input block of instruction code from the next sequential address to that of the current input block being processed). Thus, this instruction information is used for instructions which span an input block boundary. From the operation block 1060, operation moves to the flowchart block 1070.

However, at the decision block 1055, if there is no END mark pending, then operation moves to an operation block 1065, at which the sticky__P66 output 426 and the sticky__P67 output 428 from the last FCC cell is saved to the wraparound logic 260 via the FCC prefix wraparound signal 253. This prefix information is saved for processing instruction length decoding of the next sequential input block of instruction code. From the operation block 1065, operation moves to the flowchart block 1070.

At the flowchart block 1070, the processing of the subroutine of FIG. 10 terminates, and operation returns to FIG. 8.

Figure 11A:
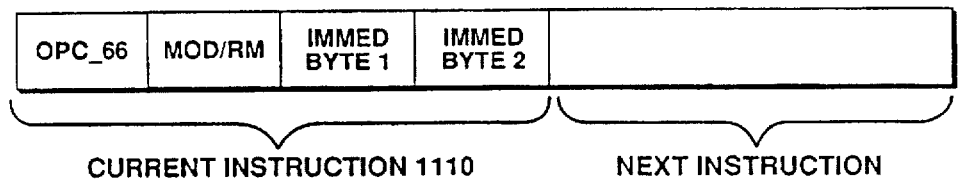
FIG. 11A is a representation showing the decoding of a 16-bit instruction which includes an opcode which is a function of the operand override prefix.

FIG. 11A is a representation showing the decoding of a 16-bit instruction which includes an opcode which is a function of the operand override prefix.

Figure 11B:
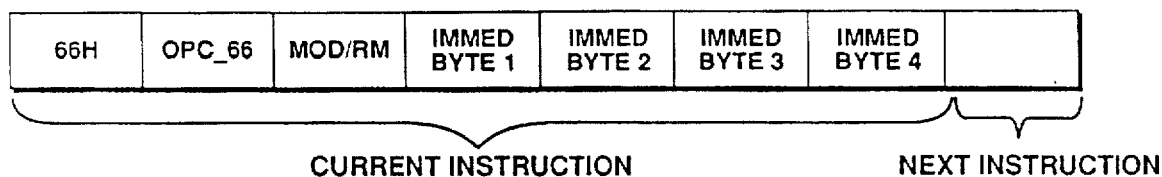
FIG. 11B is a representation showing the decoding of the 16-bit instruction of FIG. 11A when prefixed by an operand override prefix.

In the described embodiment, the operand has either a 16-bit or 32-bit default size depending upon a segment default setting. In FIGS. 11A and 11B, the segment default setting is 16-bits. When the instruction 1110 is not preceded by an operand override prefix 130, the operand size assumes the 16-bit default value.

FIG. 11B is a representation showing the decoding of the 16-bit instruction of FIG. 11A when prefixed by an operand override prefix 130, which in the described embodiment has the value 66H. In this case, the operand default size is overridden; the 16-bit operand size changes to 32-bits. Thus, two more bytes of immediate data is now required for this instruction to be decoded properly.

Figure 11C:
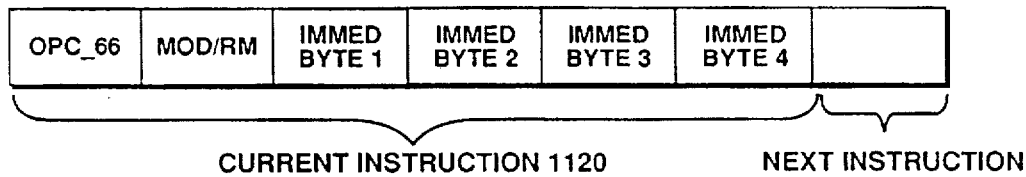
FIG. 11C is a representation showing the decoding of a 32-bit instruction which includes an opcode which is a function of the operand override prefix.
Figure 11D:
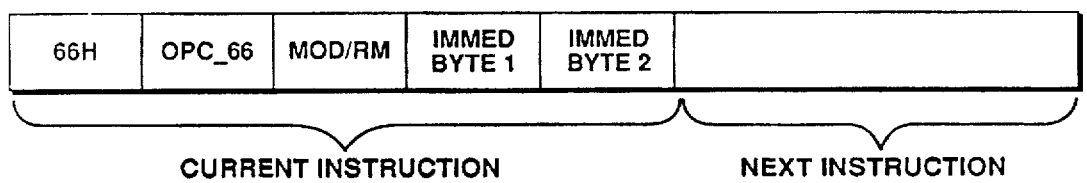
FIG. 11D is a representation showing the decoding of the 32-bit instruction of FIG. 11C when prefixed by an operand override prefix.

FIG. 11C is a representation showing the decoding of a 32-bit instruction 1120 which includes an opcode which is a function of the operand override prefix 130. The instruction 1120 is a six-byte instruction which includes an opcode which is a function of the operand override prefix. In FIGS. 11C and 11D, the segment default is 32-bits long. Thus, in the instruction of FIG. 11C, the operand assumes the 32-bit default length.

FIG. 11D is a representation showing the decoding of the 32-bit instruction of FIG. 11C when prefixed by an operand override prefix 130, which in the described embodiment has the value 66H. In this case, the operand default size is overridden; the 32-bit operand size changes to 16-bits. Thus, two less bytes of immediate data are now required for this instruction to be decoded properly. The total number of bytes that the instruction now includes is five bytes.

The address override prefix in combination with instructions which include opcodes which dynamically vary the instruction length due to the presence of the address override prefixes behave in a similar manner as that just described for the operand override prefixes and opcodes which dynamically vary the instruction length due to the operand size override presence.

The operand override prefix and the address override prefix create complications for the ILD by dynamically varying the length of the instruction as well as the size of the operands and the address specifiers.

Figure 12:
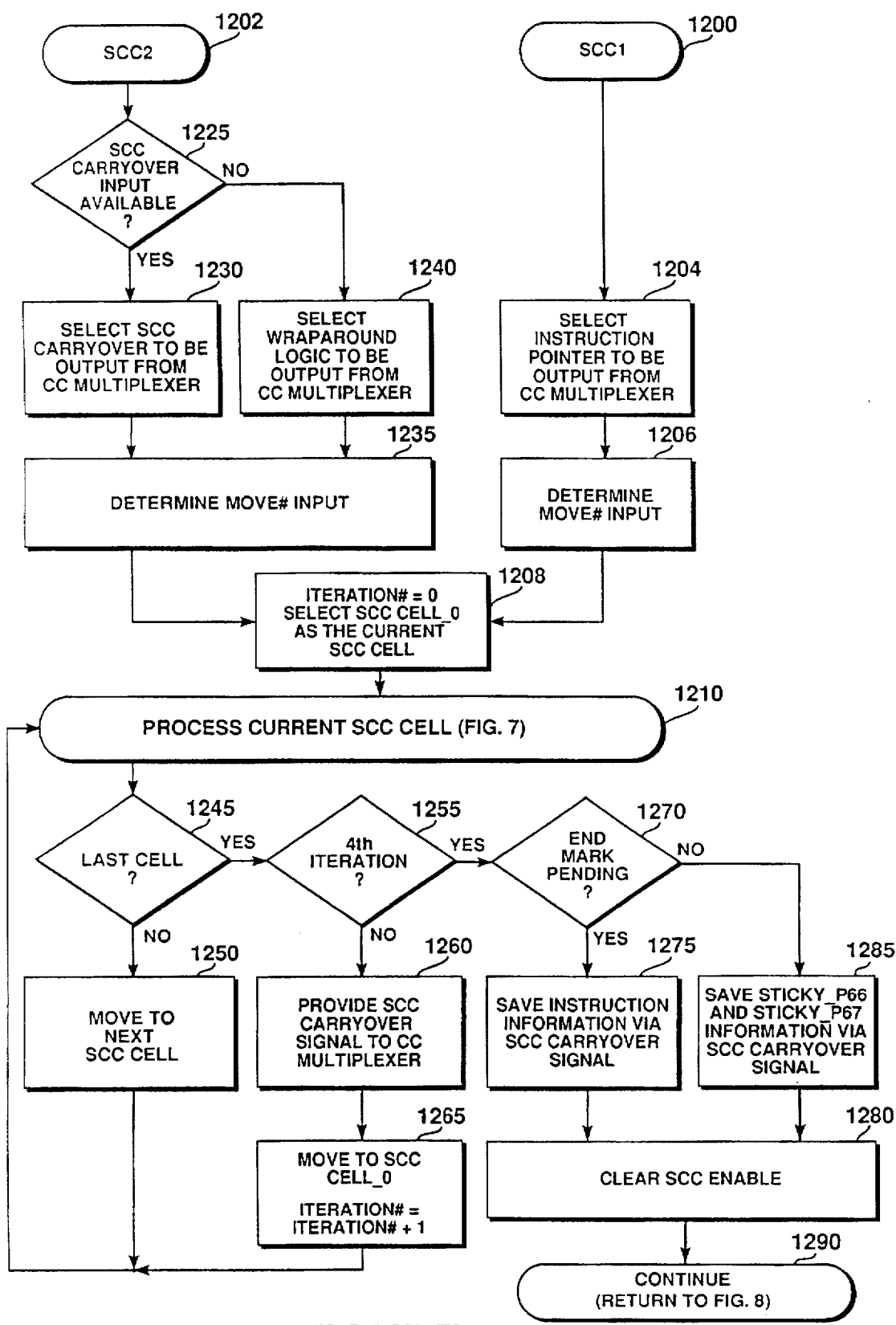
FIG. 12 is a flowchart of the steps taken by the slow carry chain circuitry in processing an input block of instruction code in the ILD.

FIG. 12 is a flowchart of the steps taken by the slow carry chain circuitry 280. FIG. 12 is a subroutine of FIG. 8; i.e., flowchart execution begins in FIG. 8, branches to FIG. 12, then resumes in FIG. 8.

Processing in the slow carry chain circuitry 280 is done serially, in a domino fashion, such that processing starts with the SCC cell0, then continues with the SCC cell__1, and so forth. The following description references a current SCC cell, which is the SCC cell at which processing is currently being performed. In the described embodiment, each byte of the input buffer 210 corresponds to one of the four SCC cells. Accordingly, once the length of a raw instruction is determined, processing of the instruction information input to the SCC cells corresponding to the bytes between the first byte and last byte of the raw instruction is skipped, since no length determination need be performed on these bytes.

FIG. 12 is substantially similar to FIG. 10 up to decision block 1255, so please see the description of FIG. 10 for details. However, there are two minor differences from FIG. 10: in the operation block 1208, a variable, iteration#, is initialized to zero, and in the flowchart block 1210, processing of the current SCC cell instead of the current FCC cell occurs. The variable, iteration#, maintains the number of iterations of processing in the slow carry chain cell. The processing of the current SCC cell at flowchart block 1210 is as described in FIG. 7.

At the decision block 1255, a determination is made whether this iteration of processing in the slow carry chain cell is the last iteration, i.e., fourth iteration for the described embodiment. If it is not the fourth iteration, then operation moves to the operation block 1260, at which the SCC carryover input 274 is provided to the CC multiplexer 270 to provide instruction information for use in processing the next SCC cells. From the operation block 1260, operation moves to the operation block 1265, at which the SCC cell__0 is selected as the current SCC cell, and the variable iteration# is incremented by one. From the operation block 1265, operation moves to the flowchart block 1210.

However, at the decision block 1255, if the current iteration is the last (fourth) iteration of processing in the slow carry chain circuitry 280, then operation moves to the decision block 1270, at which a determination is made as to whether there is an END mark pending. If there is an END mark pending, then operation moves to the operation block 1275, at which the instruction information from the slow carry chain circuitry 280 is saved via the SCC carryover input 274. From the operation block 1275, operation moves to the operation block 1280.

However, at the decision block 1270, if there is no END mark pending, then operation moves to the operation block 1285, at which the sticky__P66 output 426 and the sticky__P67 output 428 from the last SCC cell is saved to the wraparound logic via the SCC carryover input 274. From the operation block 1285, operation moves to the operation block 1280.

At the operation block 1280, the SCC Enable 254 is cleared, and operation moves to the flowchart block 1290, at which the processing of the subroutine of FIG. 12 terminates, and operation returns to FIG. 8.

Figure 13:
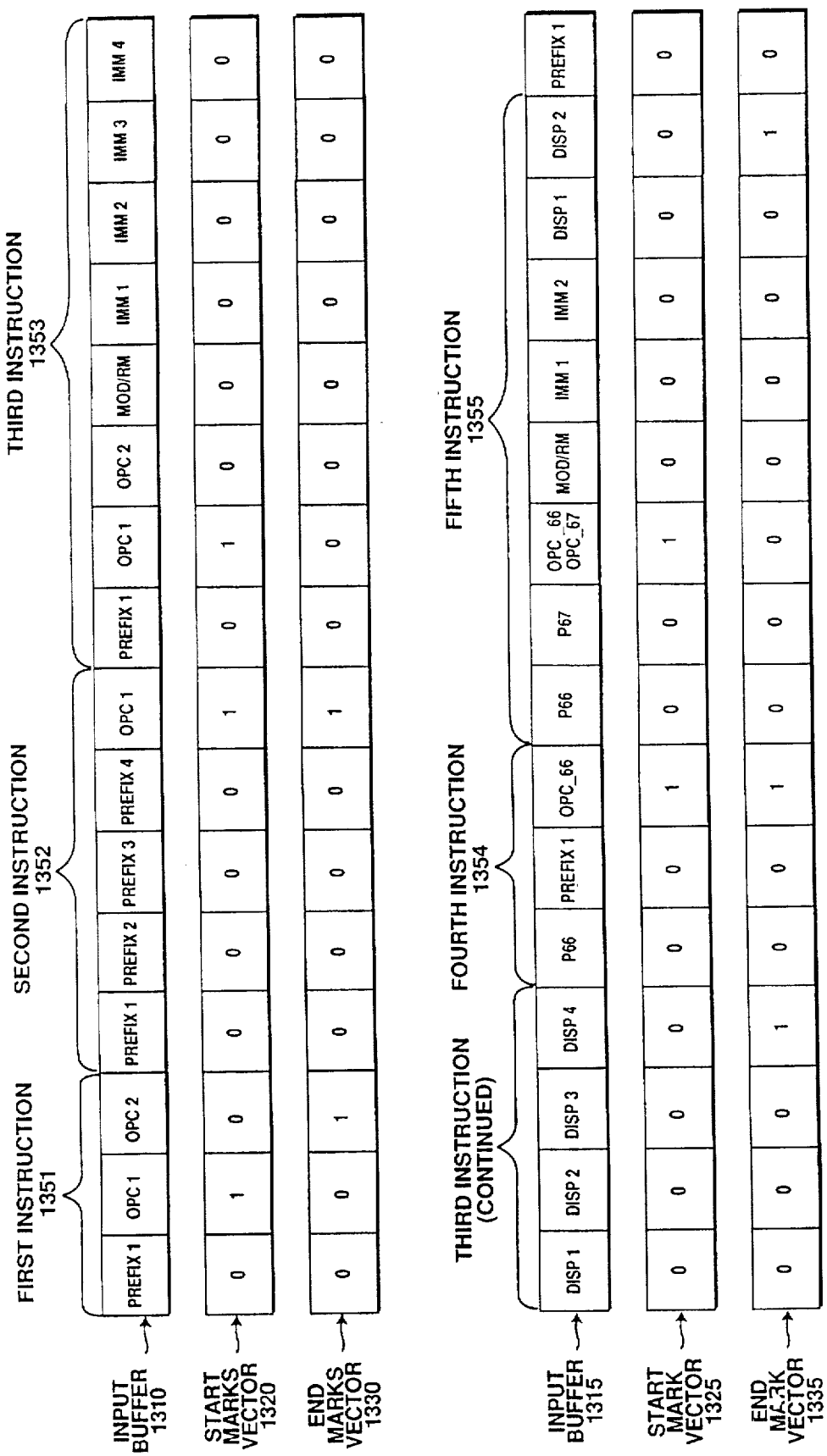
FIG. 13 is an example showing representative instructions and the corresponding opcode START marks and END marks that are generated in response to the input blocks of instruction codes.

FIG. 13 shows some representative instructions and the corresponding length mark vectors that are generated in response to the input blocks of instruction codes. Two input blocks of instruction code 1310 and 1315 are shown. Two vectors of START marks 1320 and 1325, and two vectors of END marks 1330 and 1335 are also shown.

The input blocks of instruction code 1310 and 1315 include five complete instructions 1351, 1352, 1353, 1354, and 1355. The START marks and the END mark vectors are shown with their corresponding values directly below the bytes of the input blocks of instruction code.

The ILD 50, in processing the first instruction 1351 of the input buffer, will generate a start mark associated with the first opcode byte of the instruction. The ILD will also generate an END mark for the second opcode byte of the first instruction 1351.

In processing the second instruction 1352 and the fourth instruction 1354, the ILD will generate a START mark and an END mark associated with the first opcode byte of the instruction, since there are no bytes subsequent to the first byte within the same instruction.

In processing the third instruction 1353 and the fifth instruction 1355, the ILD generates a START mark on the first byte of the raw instruction and an END mark on the last byte of the raw instruction. The fifth instruction 1355 illustrates that an opcode can be both a function of the operand override prefix 130 and a function of the address override prefix 132.

From the above description, it will be apparent that the invention disclosed herein provides a novel and advantageous instruction decoding circuit. The foregoing discussion discloses and describes exemplary methods and embodiments of the present invention. As will be understood by those familiar with the art, the invention may be embodied in other specific forms without departing from its spirit or essential characteristics, and thus, the described embodiment is not restrictive of the scope of the invention. The following claims are indicative of the scope of the invention. All variations which come within the meaning and range of equivalency of the claims are to be embraced within their scope.

What is claimed is:

1. In a processor that executes variable-length instructions, an instruction length decoder that receives an input block of instruction code including a plurality of bytes forming up to one or more instructions, each of the one or more instructions having a first byte and a last byte, the instruction length decoding circuit for providing output length marks at an instruction length decoder (ILD) output, the output length marks for identifying the first bytes and last bytes of the one or more instructions, the instruction length decoding circuit comprising:

decoding circuitry coupled to receive predetermined sets of bytes from the input block of instruction code, the decoding circuitry providing instruction information at a decoding circuitry output;

first length mark circuitry coupled to receive the instruction information from the decoding circuitry, the first length mark circuitry providing the output length marks at the ILD output; and a second length mark circuitry coupled to receive the instruction information from the decoding circuitry, in response to the detection of an instruction with a modified instruction length and providing output length marks at the ILD output, wherein the output length marks include START marks indicative of the first byte of each of the one or more instructions and END marks indicative of the last byte of each of the one or more instructions and wherein each of the one or more instructions include a first part defined by prefix bytes and a second part defined by all non-prefix bytes, and the START marks and the END marks define the boundaries of the second part of each of the one or more instructions.

2. In a processor that executes variable-length instructions, an instruction length decoder that receives an input block of instruction code including a plurality of bytes forming up to one or more instructions, each of the one or more instructions having a first byte and a last byte, the instruction length decoding circuit for providing output length marks at an instruction length decoder (ILD) output, the output length marks for identifying the first bytes and last bytes of the one or more instructions, the instruction length decoding circuit comprising:

decoding circuitry coupled to receive predetermined sets of bytes from the input block of instruction code, the decoding circuitry providing instruction information at a decoding circuitry output;

first length mark circuitry coupled to receive the instruction information from the decoding circuitry, the first length mark circuitry providing the output length marks at the ILD output; and a second lent mark circuitry coupled to receive the instruction information from the decoding circuitry, in response to the detection of an instruction with a modified instruction length and providing output length marks at the ILD output, wherein the output length marks include START marks indicative of the first byte of each of the one or more instructions and END marks indicative of the last byte of each of the one or more instructions, and wherein the decoding circuitry further comprises:

prefix circuitry coupled to receive input from the block of instruction code for detecting the presence of length-varying prefixes that conditionally vary the length of an instruction, the prefix circuitry providing prefix detection information at the decoding circuitry output, the instruction information including the prefix detection information; and opcode decoding circuitry coupled to receive input from the block of instruction code for detecting the presence of length-varying opcodes that conditionally vary the length of an instruction when paired with a matching length-varying prefix, the opcode decoding circuitry providing opcode detection information at the decoding circuitry output.

3. The instruction length decoder of claim 2 further comprising:

a second length mark circuitry coupled to receive the instruction information from the decoding circuitry, and providing output length marks at the ILD output, the second length mark circuitry employed upon detection of a length varying prefix paired with a length-varying opcode.

4. In a processor which executes variable-length instructions, and in which the length of an instruction is determinable by examining a predetermined number of initial bytes of the instruction, the processor including an input buffer, a plurality of PLAs, and fast carry chain circuitry for providing output length marks at an instruction length decoder output, the input buffer capable of receiving a plurality of bytes forming up to one or more instructions, each of the one or more instructions having a first byte and a last byte, the method comprising the steps of:

(a) providing an input block of instruction code to the input buffer;

(b) providing a set of one or more sequential bytes from the plurality of bytes of the input buffer as an input to each PLA of the plurality of PLAs;

(c) responsive to the input to each PLA, determining instruction information for each byte of the input buffer by the plurality of PLAs;

(d) providing the instruction information to the fast carry chain circuitry;

(e) generating the output length marks in the fast carry chain circuitry responsive to the instruction information; and (f) providing the output length marks at the instruction length decoder output.

5. The method of claim 4 in which the step (c) further comprises the step of:

(c1) determining instruction length information for each byte of the input buffer for which the instruction length is determinable by assuming that that byte is the first byte of an instruction.

6. The method of claim 5 wherein the fast carry chain circuitry comprises a plurality of FCC cells, each of the FCC cells receiving the instruction information from one of the plurality of PLAs, and the step (e) further comprises the steps of:

(e1) serially processing the instruction information input into each of the FCC cells of the fast carry chain circuitry by searching for a first byte of an instruction;

(e2) asserting a START mark by a FCC cell in which a first byte of an instruction is indicated;

(e3) utilizing the length information corresponding to the FCC cell in which a first byte is indicated to sequentially skip processing in a number of FCC cells corresponding to the length information; and (e4) asserting the END mark by a FCC cell in which a last byte of an instruction is indicated.

7. The method of claim 6 in which the step (e) further comprises the step of:

(e5) repeating steps (e1) through (e4) until each of the FCC cells has been processed, at which point instruction information from one or more PLAs is stored in a wraparound logic to be used for processing a subsequent input block of instruction code.

8. The method of claim 6 in which the step (c) further comprises the steps of:

(c2) determining prefix information for each byte of the input buffer and providing the prefix information to the fast carry chain circuitry, the prefix information indicating the presence of length-varying prefixes; and (c3) determining opcode information for each byte of the input buffer and providing the opcode information to the fast carry chain circuitry, the opcode information indicating the presence of length-varying opcodes.

9. The method of claim 8 in which the processor further includes slow carry chain circuitry comprised of SCC cells for providing output length marks at the instruction length decoder output, the method further comprising the steps of:

(e5) if the prefix information and the opcode information indicate that an instruction contains both a length-varying prefix and a matching length-varying opcode, then aborting processing in the fast carry chain circuitry and performing the steps of (1) asserting a SCC enable output signal coupled from the fast carry chain circuitry to the slow carry chain circuitry to enable the slow carry chain circuitry, (2) providing the instruction information to the slow carry chain circuitry, and (3) generating the output length marks in the slow carry chain circuitry responsive to the instruction information; otherwise (e6) repeating steps (e1) through (e5) until each of the SCC cells has been processed, at which point instruction information from one or more PLAs is stored in a wraparound logic to be used for processing a subsequent input block of instruction code.

10. The method of claim 8 in which the processor further includes slow carry chain circuitry comprised of SCC cells for providing output length marks at the instruction length decoder output, the method further comprising the steps of:

(e5) if the prefix information and the opcode information indicate that an instruction contains both a length-varying prefix and a matching length-varying opcode, then aborting processing in the fast carry chain circuitry and performing the steps of (1) asserting a SCC enable output signal coupled from the fast carry chain circuitry to the slow carry chain circuitry to enable the slow carry chain circuitry, (2) serially processing the instruction information input into each of the SCC cells of the slow carry chain circuitry searching for a first opcode byte, (3) asserting the START mark by the SCC cell in which a first byte is found, (4) utilizing the length information corresponding to the SCC cell in which a first byte was found to sequentially progress down the slow carry chain circuitry for the number of SCC cells corresponding to the length information, (5) asserting the END mark by a SCC cell if the last byte of the instruction is found in that SCC cell. and (6) repeating steps (2) through (5) until each of the SCC cells has been processed, at which point instruction information is stored via a SCC carryover signal to be used for processing a subsequent input block of instruction code; otherwise (e6) repeating steps (e1) through (e5) until each of the SCC cells has been processed, at which point instruction information from one or more PLAs is stored in a wraparound logic to be used for processing a subsequent input block of instruction code.

11. In a processor that executes variable-length instructions, an instruction length decoding circuit that receives an input block of instruction code including a plurality of bytes forming up to one or more instructions, each of the one or more instructions having a first byte and a last byte, the instruction length decoding circuit providing output length marks at an instruction length decoder (ILD) output, the output length marks indicative of the first bytes and last bytes of the one or more instructions, the instruction length decoding circuit comprising:

decoding means coupled to receive predetermined sets of bytes from the input block of instruction code, the decoding means providing instruction information at a decoding means output; and first length mark output means coupled to receive the instruction information from the decoding means, the first length mark output means providing the output length marks at the ILD output and second length mark output means coupled to receive the instruction information from the decoding means in response to the detection of an instruction with a modified instruction length and providing output length marks at the ILD output in response to the detection of an instruction with a modified instruction length, wherein the output length marks include START marks indicative of the first byte of each of the one or more instructions and END marks indicative of the last byte of each of the one or more instructions;

wherein each of the one or more instructions include a first part defined by prefix bytes and a second part defined by all non-prefix bytes, and the START marks and the END marks define the boundaries of the second part of each of the one or more instructions.

12. In a processor that executes variable-length instructions, an instruction length decoding circuit that receives an input block of instruction code including a plurality of bytes forming up to one or more instructions, each of the one or more instructions having a first byte and a last byte, the instruction length decoding circuit providing output length marks at an instruction length decoder (ILD) output, the output length marks indicative of the first bytes and last bytes of the one or more instructions, the instruction length decoding circuit comprising:

decoding means coupled to receive predetermined sets of bytes from the input block of instruction code, the decoding means providing instruction information at a decoding means output;

first length mark output means coupled to receive the instruction information from the decoding means, the first length mark output means providing the output length marks at the ILD output and second length mark output means coupled to receive the instruction information from the decoding means in response to the detection of an instruction with a modified instruction length and providing output length marks at the ILD output in response to the detection of an instruction with a modified instruction lengths, wherein the output length marks include START marks indicative of the first byte of each of the one or more instructions and END marks indicative of the last byte of each of the one or more instructions, wherein the decoding means further comprises:

prefix detecting means coupled to receive input from the block of instruction code for detecting the presence of length-varying prefixes that conditionally vary the length of an instruction, the prefix detecting means providing prefix detection information at the decoding means output, the instruction information including the prefix detection information; and opcode detecting means coupled to receive input from the block of instruction code for detecting the presence of length-varying opcodes that conditionally vary the length of an instruction when paired with a matching length-varying prefix, the opcode detecting means providing opcode detection information at the decoding means output.

13. The instruction length decoding circuit of claim 12 further comprising:

a second length mark output means coupled to receive the instruction information from the decoding means, and providing output length marks at the ILD output, the second length mark output means employed upon detection of a length varying prefix paired with a length-varying opcode.

14. In a processor which executes variable-length instructions, and in which the length of an instruction is determinable by examining a predetermined number of initial bytes of the instruction, the processor including an input buffer a decoding means, and a first length mark output means for providing output length marks at an instruction length decoder output, the first length mark output means including a plurality of FCC cells, each of the FCC cells receiving the instruction information from the decoding means, the input buffer being capable of receiving a plurality of bytes forming up to one or more instructions, each of the or more instructions having a first byte and a last byte, the method comprising the steps of:

(a) providing an input block of instruction code to the input buffer, (b) providing a set of one or more sequential bytes from the plurality of bytes of the input buffer as an input to the decoding means;

(c) responsive to the input to the decoding means, determining instruction information for each byte of the input buffer by the decoding means;

(d) providing the instruction information to the first length mark output means;

(e) generating the output length marks in the first length mark output means responsive to the instruction information by:

(e1) serially processing the instruction information input into each of the FCC cells of the first length mark output means by searching for a first byte of an instruction;

(e2) asserting a START mark by a FCC cell in which a first byte of an instruction is indicated;

(e3) utilizing the length information corresponding to the FCC cell in which a first byte is indicated to sequentially skip processing in a number of FCC cells corresponding to the length information;

(e4) asserting the END mark by a FCC cell in which a last byte of an instruction is indicated; and (f) providing the output length marks at the instruction length decoder output.

15. The method of claim 14 in which the step (e) further comprises the step of:

(e5) repeating steps (e1) through (e4) until each of the FCC cells has been processed, at which point instruction information from the decoding means is stored in a wraparound logic to be used for processing a subsequent input block of instruction code.

16. The method of claim 14 in which the step (c) further comprises the steps of:

(c2) determining prefix information for each byte of the input buffer and providing the prefix information to the first length mark output means, the prefix information indicating the presence of length-varying prefixes; and (c3) determining opcode information for each byte of the input buffer and providing the opcode information to the first length mark output means, the opcode information indicating the presence of length-varying opcodes.

17. The method of claim 16 in which the processor further includes a second length mark output means comprised of SCC cells for providing output length marks at the instruction length decoder output, the method further comprising the steps of:

(e5) if the prefix information and the opcode information indicate that an instruction contains both a length-varying prefix and a matching length-varying opcode, then aborting processing in the first length mark output means and performing the steps of (1) asserting a SCC enable output signal coupled from the first length mark output means to the second length mark output means to enable the second length mark output means, (2) providing the instruction information to the second length mark output means, and (3) generating the output length marks in the second length mark output means responsive to the instruction information; otherwise (e6) repeating steps (e1) through (e5) until each of the FCC cells has been processed, at which point instruction information from the decoding means is stored in a wraparound logic to be used for processing a subsequent input block of instruction code.

18. The method of claim 16 in which the processor further includes a second length mark output means comprised of SCC cells for providing output length marks at the instruction length decoder output, the method further comprising the steps of:

(e5) if the prefix information and the opcode information indicate that an instruction contains both a length-varying prefix and a matching length-varying opcode, then aborting processing in the first length mark output means and performing the steps of (1) asserting a SCC enable output signal coupled from the first length mark output means to the second length mark output means to enable the second length mark output means, (2) serially processing the instruction information input into each of the SCC cells of the second length mark output means searching for a first opcode byte, (3) asserting the START mark by the SCC cell in which a first byte is found, (4) utilizing the length information corresponding to the SCC cell in which a first byte was found to sequentially progress down the second length mark output means for the number of SCC cells corresponding to the length information, (5) asserting the END mark by a SCC cell if the last byte of the instruction is found in that SCC cell, and (6) repeating steps (2) through (5) until each of the SCC cells has been processed, at which point instruction information is stored via a SCC carryover signal to be used for processing a subsequent input block of instruction code; otherwise (e6) repeating steps (e1) through (e5) until each of the SCC cells has been processed, at which point instruction information from the decoding means is stored in a wraparound logic to be used for processing a subsequent input block of instruction code.

19. A processor for executing variable length instructions, the length of each variable length instruction being determinable by examining a predetermined number of initial bytes of a given instruction, comprising:

an input buffer capable of receiving a plurality of bytes forming up to one or more instructions, each of the one or more instructions having a first byte and a last byte, the input buffer for receiving an input block of instruction code;

a plurality of PLA's for receiving a set of one or more sequential bytes from the plurality of bytes of the input buffer as an input to each PLA of the plurality of PLA's, the plurality of PLA's determining instruction information for each byte of the input buffer;

fast carry chain circuitry for providing output length marks at an instruction length decode output, the output length marks being generated in a fast carry chain circuitry in response to the instruction information, the output length marks being outputted at the instruction length decoder output.

20. A processor according to claim 19, wherein the fast carry chain circuitry comprises a plurality of FCC cells, each of the FCC cells for receiving the instruction information from one of the plurality of PLA's and generating the output length marks.

21. A processor according to claim 20 further comprising slow carry chain circuitry having SCC cells for providing output length marks at the instruction length decoder output, wherein when each of the SCC cells has been processed, instruction information from one or more PLAs is stored in a wraparound logic to be used for processing a subsequent input block of instruction code.

* * * * *